US006460349B1

(12) United States Patent
Kawano et al.

(10) Patent No.: US 6,460,349 B1
(45) Date of Patent: Oct. 8, 2002

(54) ROTARY VALVE UNIT IN A PULSE TUBE REFRIGERATOR

(75) Inventors: Shin Kawano, Kariya; Masahumi Nogawa, Toyota; Shinji Katsuragawa, Chiryu; Tatsuo Inoue, Anjo, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/996,768

(22) Filed: Nov. 30, 2001

(30) Foreign Application Priority Data

Nov. 30, 2000 (JP) ........................ 2000-364341
Jul. 26, 2001 (JP) ........................ 2001-226610

(51) Int. Cl.⁷ .............................................. F25B 9/00
(52) U.S. Cl. ........................................ 62/6; 251/129.11
(58) Field of Search .............. 62/6; 60/520; 251/129.11

(56) References Cited

U.S. PATENT DOCUMENTS

| 5,904,046 A | 5/1999 | Kawano |
| 6,094,921 A | 8/2000 | Zhu et al. |
| 6,196,006 B1 | 3/2001 | Kawano |
| 6,279,324 B1 | 8/2001 | Zhu et al. |
| 6,301,902 B1 | 10/2001 | Zhu et al. |
| 6,308,520 B1 | 10/2001 | Inoue et al. |
| 6,351,954 B1 * | 3/2002 | Nogawa et al. ............. 62/6 |
| 6,378,312 B1 * | 4/2002 | Wang .......................... 62/6 |
| 6,393,845 B1 * | 5/2002 | Nogawa et al. ............. 62/6 |

FOREIGN PATENT DOCUMENTS

JP 2553822 2/1995

OTHER PUBLICATIONS

M. David, et al., Cryogenics, vol. 30, pp. 262–266, "How To Achieve The Efficiency of a Gifford–Mac Mahon Cryocooler With A Pulse Tube Refrigerator", Sep. 1990.

* cited by examiner

Primary Examiner—Ronald Capossela
(74) Attorney, Agent, or Firm—Oblon, Spivak, McClelland, Maier & Neustadt, P.C.

(57) ABSTRACT

A rotary valve unit in a pulse tube refrigerator is quiet, and has high durability and improved refrigeration efficiency by restricting the generation of unidirectional flow. A center hole is formed on a sliding plane side as a recessed space in the sliding surfaces between the sliding plane and another sliding plane. Since the second center hole is in communication with a low pressure input port via a communication passage, the leakage between the sliding surfaces of the sliding planes can be introduced to the low pressure input port with low pressure.

21 Claims, 13 Drawing Sheets

A-A

B-B

C-C

D-D

E-E

F-F

ROTARY VALVE UNIT IN A PULSE TUBE REFRIGERATOR

BACKGROUND OF THE INVENTION

This application is based on and claims priority under 35 U.S.C. § 119 with respect to Japanese Application No. 2000-364341, filed on Nov. 30, 2000, and Japanese Application No. 2001-226610 filed on Jul. 26, 2001, the entire contents of which are incorporated herein by reference.

FIELD OF THE INVENTION

This invention generally relates to a pressure switching mechanism for the operation gas of a pulse tube refrigerator used for cryogenic refrigeration and a pulse tube refrigerator having the same. More particularly, the present invention pertains to a rotary valve unit for achieving high performance cryogenic effects and a pulse tube refrigerator applied therewith.

DESCRIPTION OF THE BACKGROUND

A known pulse tube refrigerator is disclosed in *Cryogenics*, Vol. 30 September Supplement (1990), p.262. FIG. 13 shows the structure of the foregoing known pulse tube refrigerator. A pulse tube refrigerator 611 includes a cold head 303, a regenerator 301 has a regenerator port 311 on one end and is in communication with the cold head 303 on the other end, a pulse tube 302 has a pulse tube port 312 on one end and is in communication with the cold head 303 on the other end. A first solenoid valve 701 and a second solenoid valve 702 are positioned in parallel to each other and are connected to the regenerator port 311 of the regenerator 301 via a regenerator line 321. A third solenoid valve 703 is connected to the pulse tube port 312 of the pulse tube 302 via a pulse tube line 322. A compressor unit 100 has an outlet port 111 and an inlet port 112, in which the outlet port 111 is connected to the first solenoid valve 701 via a high pressure line 121 and the inlet port 112 is connected to the second solenoid valve 702 via a low pressure line 122. A reservoir 401 having a reservoir port 411 is connected to the third solenoid valve 703 via a reservoir line 421. The pressure of the outlet port 111 of the compressor unit 100 corresponds to a high pressure PH, the pressure of the inlet port 112 of the compressor unit 100 corresponds to a low pressure PL, and the pressure in the reservoir 401 corresponds to a middle pressure PM. The high pressure PH is determined to be higher than the middle pressure PM and the middle pressure PM is determined to be higher than the low pressure PL.

The operation of the foregoing pulse tube refrigerator 611 will be explained as follows. First, when the first solenoid valve 701 and the second solenoid valve 702 are closed and the pressure in the pulse tube 302 and the regenerator 301 correspond to the low pressure PL of the inlet port 112, the third solenoid valve 703 is opened. The gas in the reservoir 401 is supplied to the pulse tube port 312 of the pulse tube 302, and thus to increase the pressure of the pulse tube 302 and the regenerator 301 from the low pressure PL to the middle pressure PM corresponding to the pressure in the reservoir 401. Then, the third solenoid valve 703 is closed.

Second, the first solenoid valve 701 is opened. The high pressure gas with the high pressure PH which is compressed and the heat of which is radiated in the compressor unit 100 is cooled down in the regenerator 301 and supplied to the cold head 303 side of the pulse tube 302 to increase the pressure of the regenerator 301 and the pulse tube 302 from the middle pressure PM corresponding to the pressure of the reservoir 401 to the high pressure PH corresponding to the pressure of the outlet port 111. Then the first solenoid valve 701 is closed.

Third, the third solenoid valve 703 is opened. The gas in the pulse tube port 312 side of the pulse tube 302 is returned to the reservoir 401 to decrease the pressure of the pulse tube 302 and the regenerator 301 from the high pressure PH to the middle pressure PM corresponding to the pressure of the reservoir 401. In this case, the gas temperature in the cold head 303 side of the pulse tube 302 becomes lower than the temperature of the cold head 303 due to the adiabatic expansion. Then, the third solenoid valve 703 is closed.

Finally, the second solenoid valve 702 is opened. The gas is returned to the compressor unit 100 to decrease the pressure of the regenerator 301 and the pulse tube 302 from the middle pressure PM to the low pressure PL corresponding to the pressure of the inlet port 112. In this case, the gas temperature in the cold head 303 side of the pulse tube 302 becomes lower due to adiabatic expansion. The gas with lowered temperature is returned to the compressor unit 100 while cooling down the cold head 303 and the regenerator 301. Then, the second solenoid valve 702 is closed.

The foregoing process is determined as one cycle. By repeating this cycle with a frequency of one to several Hz, a cryogenic temperature is generated at the cold head 303.

According to the pulse tube refrigerator 611, since the pressure in the regenerator 301 and the pulse tube 302 has been increased from the low pressure PL to the middle pressure PM corresponding to the pressure in the reservoir 401 before the first solenoid valve 701 is opened, the loss caused by the differential pressure generated when the high pressure gas with high pressure PH is supplied from the outlet port 111 of the compressor unit 100 to the regenerator 301 and the pulse tube 302 after the first solenoid valve 701 is opened is reduced.

In addition, since the pressure of the regenerator 301 and the pulse tube 302 is decreased from the high pressure PH to the middle pressure PM corresponding to the pressure of the reservoir 401 before opening the second solenoid valve 702, the loss caused due to the differential pressure generated when the gas of the regenerator 301 and the pulse tube 303 is supplied to the inlet port 112 with the low pressure PL corresponding to the pressure of the compressor unit 100 when opening the second solenoid valve 702 is reduced.

Another known pulse tube refrigerator is shown in FIG. 14. A pulse tube refrigerator 612 includes a cold head 303. A regenerator 301 has a regenerator port 311 on one end and is in communication with the cold head 303 on the other end. A pulse tube 302 has a pulse tube port 312 on one end and is in communication with the cold head 303 on the other end. A first solenoid valve 701 and a second solenoid valve 702 are positioned in parallel each other and are connected to the regenerator port 311 of the regenerator 301 via a regenerator line 321. A third solenoid valve 703 and a fourth solenoid valve 704 are positioned in parallel and are connected to the pulse tube port 312 of the pulse tube 302 via a pulse tube line 322. A compressor unit 100 has an outlet port 111 and an inlet port 112 in which the outlet port 11 is connected to the first solenoid valve 701 via a high pressure line 121 and the inlet port 112 is connected to the second solenoid valve 702 via a low pressure line 122. A reservoir 401 has a reservoir port 411 which is connected to the third solenoid valve 703 via a reservoir line 421, and an auxiliary reservoir 402 has an auxiliary reservoir port 412, and the auxiliary reservoir port 412 is connected to the fourth solenoid valve 704 via an auxiliary reservoir line 422. The pressure of the outlet port 111 of the compressor unit 100 corresponds to a high pressure PH, the pressure of the inlet port 112 of the compressor unit 100 corresponds to a low pressure PL, the pressure in the reservoir 401 corresponds to a first middle pressure PM1, and the pressure in the auxiliary reservoir 402 corresponds to a second middle pressure PM2. The high pressure PH is determined to be higher than the second middle pressure PM2, the second middle pressure PM2 is determined to be higher than the first middle pressure PM1 and the first middle pressure PM1 is determined to be higher than the low pressure PL (PM>PM2 >PM1>PL). The second middle pressure PM2 is determined to be higher than the middle pressure PM of the first known pulse tube refrigerator shown in FIG. 13. The first middle pressure PM1 is determined to be less than the middle pressure PM of the first known pulse tube refrigerator shown in FIG. 13. That is, the second middle pressure PM2 is determined to be higher than the middle pressure PM and the middle pressure PM is determined to be higher than the first middle pressure PM1 (PM2 >PM>PM1).

The operation of the foregoing known pulse tube refrigerator 612 will be explained as follows. First, when the first solenoid valve 701, the second solenoid valve 702, and the fourth solenoid valve 704 are closed and the pressure in the pulse tube 302 and the regenerator 301 corresponds to the low pressure PL of the inlet port 112, the third solenoid valve 703 is opened. The gas in the reservoir 401 is supplied to the pulse tube port 312 side of the pulse tube 302, thus to increase the pressure of the pulse tube 302 end the regenerator 301 from the low pressure PL to the first middle pressure PM1 corresponding to the pressure in the reservoir 401. Then, the third solenoid valve 703 is closed.

Second, the fourth solenoid valve 704 is opened. The gas in the auxiliary reservoir 402 is supplied to the pulse tube port 312 side of the pulse tube 302 to increase the pressure of the pulse tube 302 and the regenerator 301 from the first middle pressure PM1 corresponding to the pressure of the reservoir 401 to the second middle pressure PM2 corresponding to the pressure of the auxiliary reservoir 402. Then, the fourth solenoid valve 704 is closed.

Third, the first solenoid valve 701 is opened. The high pressure gas with the high pressure PH which is compressed and the heat of which is radiated in the compressor unit 100 is cooled down in the regenerator 301 and supplied to the cold head 303 side of the pulse tube 302 to increase the pressure of the regenerator 301 and the pulse tube 302 from the second middle pressure PM2 corresponding to the pressure of the auxiliary reservoir 402 to the high pressure PH corresponding. to the pressure of the outlet port 111. Then, the first solenoid valve 701 is closed.

Fourth, the fourth solenoid valve 704 is opened. The gas of the pulse tube port 312 side of the pulse tube 302 is returned to the auxiliary reservoir 402 to decrease the pressure of the pulse tube 302 and the regenerator 301 from the high pressure PH corresponding to the pressure of the outlet port 111 of the compressor unit 100 to the second middle pressure PM2 corresponding to the pressure of the auxiliary reservoir 402. In this case, the gas temperature of the cold head 303 side of the pulse tube 302 becomes lower than the temperature of the cold head 303 due to the adiabatic expansion. Then, the fourth solenoid valve 704 is closed. Fifth, the third solenoid valve 703 is opened. The gas in the pulse tube port 312 side of the pulse tube 302 is returned to the reservoir 401 to decrease the pressure of the pulse tube 802 and the regenerator 801 from the second middle pressure PM2 corresponding to the pressure of the auxiliary reservoir 402 to the first middle pressure PM1 corresponding to the pressure of the reservoir 401. In this case, the gas temperature in the cold head 303 side of the pulse tube 302 becomes further lower than the temperature of the cold head 303 due to the adiabatic expansion. Then, the third solenoid valve 703 is closed.

Finally, the second solenoid valve 702 is opened. The gas is returned to the compressor unit 100 to decrease the pressure of the regenerator 301 and the pulse tube 302 from the first middle pressure PM1 to the low pressure PL corresponding to the pressure of the inlet part 112. In this case, the gas temperature in the cold head 303 side of the pulse tube 302 becomes further lower due to the adiabatic expansion. The gas with lowered temperature is returned to the compressor unit 100 while cooling down the cold head 303 and the regenerator 301. Then, the second solenoid valve 702 is closed.

The foregoing process is defined as one cycle. By repeating the cycles with a frequency of one to several Hz, a cryogenic temperature is generated at the cold head 303. According to the pulse tube refrigerator 612, since the pressure in the regenerator 301 and the pulse tube 302 has been increased to the second middle pressure PM2 corresponding to the pressure in the auxiliary reservoir 402 before the first solenoid valve 701 is opened, the loss caused by the differential pressure generated when the high pressure gas with high pressure PH is supplied from the outlet port 111 of the compressor unit 100 to the regenerator 301 and the pulse tube 302 after the first solenoid valve 701 is opened is further reduced as compared to the pulse tube refrigerator 611. In addition, since the pressure of the regenerator 301 and the pulse tube 302 is decreased to the first middle pressure PM1 corresponding to the pressure of the reservoir 401 before opening the second solenoid valve 702, the loss caused due to the differential pressure generated when the gas of the regenerator 301 and the pulse tube 302 is returned to the inlet port 112 with low pressure PL of the compressor unit 100 when opening the second solenoid valve 702 is further reduced compared to the pulse tube refrigerator 611.

FIG. 15 shows a further known pulse tube refrigerator disclosed in *Advances in Cryogenic Engineering*, Vol. 43 (1998) P. 1983. A pulse tube refrigerator 613 includes a cold head 303, a regenerator 301 has a regenerator port 311 on one end and is in communication with the cold head 303 on the other end. A pulse tube 302 has a pulse tube port 312 on one end and is in communication with the cold head 303 on the other end. A first solenoid valve 701 and a second solenoid valve 702 are positioned in parallel with each other and are connected to the regenerator port 311 of the regenerator 301 via a regenerator line 321. A third solenoid valve 703, a fifth solenoid valve 705 and a sixth solenoid valve 706 are positioned in parallel with one another and are connected to the pulse tube port 312 of the pulse tube 302 via a pulse tube line 322. A compressor unit 100 has an outlet port 111 and an inlet port 112, in which the outlet port 111 is connected to the first solenoid valve 701 and the fifth solenoid valve 705 via a high pressure line 121 and the inlet port 112 is connected to the second solenoid valve 702 and the sixth solenoid valve 706 via a low pressure line 122. A reservoir 401 has a reservoir port 411 which is connected to the third solenoid valve 703 via a reservoir line 421. The pressure of the outlet port 111 of the compressor unit 100 corresponds to a high pressure PH, the pressure of the inlet port 112 of the compressor unit 100 corresponds to a low pressure PL, and the pressure in the reservoir 401 corresponds to a middle pressure PM. The high pressure PH is determined to be higher than the middle pressure PM and the middle pressure PM is determined to be higher than the low pressure PL (PH>PM>PL).

The operation of the pulse tube refrigerator 613 will be explained as follows. First, when the first solenoid valve 701, the second solenoid valve 702, the fifth solenoid valve 705, and the sixth solenoid valve 706 are closed and the pressure in the pulse tube 302 and the regenerator 301 corresponds to the low pressure PL of the inlet port 112, the third solenoid valve 703 is opened. The gas in the reservoir 401 is supplied to the pulse tube port 312 side of the pulse tube 302, thus to increase the pressure of the pulse tube 302 and the regenerator 301 from the low pressure PL to the middle pressure PM corresponding to the pressure in the reservoir 401. Then the third solenoid valve 703 is closed.

Second, the first solenoid valve 701 and the fifth solenoid valve 705 are opened. The high pressure gas with the high pressure PH which is compressed and the heat of which is radiated in the compressor unit 100 is cooled down in the regenerator 301 and supplied to the cold head 303 side of the pulse tube 302 via the pulse tube port 312 side of the pulse tube 302 to increase the pressure of the regenerator 301 and the pulse tube 302 from the middle pressure PM corresponding to the pressure of the reservoir 401 to the high pressure PH corresponding to the pressure of the outlet port 111. The fifth solenoid valve 705 is closed during this process, then the first solenoid valve 701 is closed at the end of this process.

Third, the third solenoid valve 703 is opened. The gas in the pulse tube port 312 side of the pulse tube 302 is returned to the reservoir 401 to decrease the pressure of the pulse tube 302 and the regenerator 301 from the high pressure PH to the middle pressure PM corresponding to the pressure of the reservoir 401. In this case, the gas temperature in the cold head 303 side of the pulse tube 302 becomes lower than the temperature of the cold head 303 due to the adiabatic expansion. Then, the third solenoid valve 703 is closed.

Finally, the second solenoid valve 702 and the sixth solenoid valve 706 are opened. The gas is returned to the compressor unit 100 to decrease the pressure of the regenerator 301 and the pulse tube 302 from the middle pressure PM to the low pressure PL corresponding to the pressure of the inlet port 112. In this case, the gas temperature in the cold head 303 side of the pulse tube 302 becomes further lower due to the adiabatic expansion. The gas with lowered temperature is returned to the compressor unit 100 while cooling down the cold head 303 and the regenerator 301 and is returned from the pulse tube port 312 side of the pulse tube 302 to the compressor unit 100. The sixth solenoid valve 706 is closed during this process, and the second solenoid valve 702 is closed at the end of this process.

The foregoing process is defined as one cycle. By repeating the cycle with a frequency of one to several Hz, a cryogenic temperature is generated at the cold head 303.

According to the pulse tube refrigerator 613, like the pulse tube refrigerator 611, the loss caused due to the differential pressure when the first solenoid valve 701 and the second. solenoid valve 702 are opened is reduced. In addition, since the first solenoid valve 701 is opened while the fifth solenoid valve 705 is still open and the second solenoid valve 702 is opened while the sixth solenoid valve 706 is still open, the heat loss caused by the displacement of the gas in the cold head 303 side of the pulse tube 302 generated when the first solenoid valve 701 and the second solenoid valve 702 are opened is reduced.

FIG. 16 shows a still further known pulse tube refrigerator disclosed in a Japanese patent no. 2553822. A pulse tube refrigerator 614 includes a cold head 303, a regenerator 301 has a regenerator port 311 on one end and is in communication with the cold head 303 on the other end, a pulse tube 302 has a pulse tube port 312 on one end and is in communication with the cold head 303 on the other end. A first solenoid valve 701 and a second solenoid valve 702 are arranged in parallel and are connected to the regenerator port 311 of the regenerator 301 via a regenerator line 321, a third solenoid valve 703, a seventh solenoid valve 707, and a eighth solenoid valve 708 which are positioned in parallel one another and are connected to the pulse tube port 312 of the pulse tube 302 via a pulse tube line 322. A compressor unit 100 has an outlet port 111 and an inlet port 112. The outlet port 111 is connected to the first solenoid valve 701 via a high pressure line 121 and the inlet port 112 is connected to the second solenoid valve 702 via a low pressure line 122. A reservoir 401 has a reservoir port 411 which is connected to the third solenoid valve 703 via a reservoir line 421. A high pressure reservoir 403 has a high pressure reservoir port 413 which is connected to the seventh solenoid valve 707 via a high pressure reservoir line 423, and a low pressure reservoir 404 has a low pressure reservoir port 414 which is connected to the eighth solenoid valve 708 via low pressure reservoir line 424. The pressure of the outlet port 111 of the compressor unit 100 corresponds to a high pressure PH, the pressure of the inlet port 112 of the compressor unit 100 corresponds to a low pressure PL, and the pressure in the reservoir 401 corresponds to a middle pressure PM. The high pressure PH is determined to be higher than the middle pressure PM and the middle pressure PM is determined to be higher than the low pressure PL (PH>PM>PL). The pressure of the high pressure reservoir 403 is approximately the same as the high pressure PH, and the pressure of the low pressure reservoir 404 is approximately the same as the low pressure PL.

The pulse tube refrigerator 614 corresponds to the pulse tube refrigerator 611 added with the high pressure reservoir 403 and the low pressure reservoir 404 which are connected to the pulse tube port 312 via the seventh solenoid valve 707 and the eighth solenoid valve 708 respectively.

The operation of the pulse tube refrigerator 614 will be explained as follows. First, when the first solenoid valve 701, the second solenoid valve 702, the seventh solenoid valve 707 and the eighth solenoid valve 708 are closed and the pressure in the pulse tube 302 and the regenerator 301 corresponds to the low pressure PL of the inlet port 112, the third solenoid valve 703 is opened. The gas in the reservoir 401 is supplied to the pulse tube port 312 side of the pulse tube 302, thus to increase the pressure of the pulse tube 302 and the regenerator 301 from the low pressure PL to the middle pressure PM corresponding to the pressure in the reservoir 401. Then, the third solenoid valve 703 is closed.

Second, the seventh solenoid valve 707 is opened first, then the first solenoid valve 701 is opened. Along with the supply of the gas of the high pressure reservoir 403 to the pulse tube port 312 side of the pulse tube 302, the high pressure gas with the high pressure PH which is compressed and the heat of which is radiated in the compressor unit 100 is cooled down in the regenerator 301 and supplied to the cold head 303 side of the pulse tube 302 to increase the pressure of the regenerator 301 and the pulse tube 302 from the middle pressure PM corresponding to the pressure of the reservoir 401 to the high pressure PH corresponding to the pressure of the outlet port 111. Then, the first solenoid valve 701 is closed. During this process, the gas supplied from the high pressure reservoir 403 to the pulse tube port 312 side of the pulse tube 302 when opening the seventh solenoid valve 707 is returned to the high pressure reservoir 403 after the first solenoid valve 701 is opened. Then, the seventh solenoid valve 707 and the first solenoid valve 701 are closed.

Third, the third solenoid valve 703 is opened. The gas in the pulse tube port 312 side of the pulse tube 302 is returned to the reservoir 401 to decrease the pressure of the pulse tube 302 and the regenerator 301 from the high pressure PH to the middle pressure PM corresponding to the pressure of the reservoir 401. In this case, the gas temperature in the cold head 303 side of the pulse tube 302 becomes lower than the temperature of the cold head 303 due to the adiabatic expansion. Then, the third solenoid valve 703 is closed.

Finally, the eighth solenoid valve 708 is opened first, then the second solenoid valve 702 is opened. Along with the return of the gas of the pulse tube side port 312 of the pulse tube 302 to the low pressure reservoir 404, the gas is returned to the compressor unit 100 to decrease the pressure of the regenerator 301 and the pulse tube 302 from the middle pressure PM to the low pressure PL corresponding to the pressure of the inlet port 112. In this case, the gas temperature in the cold head 303 side of the pulse tube 302 becomes further lower due to the adiabatic expansion. The gas with lowered temperature is returned to the compressor unit 100 while cooling down the cold head 303 and the regenerator 301. During this process, the gas which is returned from the pulse port 312 side of the pulse tube 302 when the eighth solenoid valve 708 is opened is supplied to the pulse tube port 312 side of the pulse tube 302 after opening the second solenoid valve 702. Then, the eighth solenoid valve 708 and the second solenoid valve 702 are closed.

The foregoing process is defined as one cycle. By repeating this cycle with a frequency of one to several Hz, a cryogenic temperature is generated at the cold head 303.

According to the pulse tube refrigerator 614, like the pulse tube refrigerator 611 the loss caused by the differential pressure generated when the first solenoid valve 701 and the second solenoid valve 702 are opened is reduced. In addition, the heat loss derived from the displacement of the gas in the cold head 303 side of the pulse tube 302 generated when the first solenoid valve 701 and the second solenoid valve 702 are opened is reduced.

Proceedings of the 1998 *Meetings of Refrigeration Commission*, Cryogenic Association of Japan (1999) p.8 discloses a pulse tube refrigerator which realized the pulse tube refrigerator 614 by replacing the pressure switching mechanism including the first solenoid valve 701, the second solenoid valve 702, the third solenoid valve 703, the seventh solenoid valve 707 and the eighth solenoid valve 708 with a rotary valve unit. FIG. 17 shows the rotary valve unit and the pulse tube refrigerator applied therewith.

A rotary valve unit 211 includes a first valve seat 1, a first valve element 2, a second valve seat 3, a second valve element 4, a motor (not shown), and a housing (not shown) for accommodating the aforementioned members. The first valve seat 1 is fixed to the housing. As shown in FIG. 17, two first output passages 12 which are positioned symmetrical to the rotation axis are formed on the first valve seat. The first output passages 12 are in communication with a regenerator port 311 of a regenerator 301 via a regenerator line 321 and a first output port 63.

The first valve element 2 contacting the first valve seat 1 is fixed to a shaft (not shown) of the motor. As shown in FIG. 17, two high pressure grooves 22 which are recessed by a predetermined depth in the radial direction from the circumference are formed having rotational symmetry along the axis. A low pressure groove 23 recessed by a predetermined depth from the center in the radial direction is formed at a right angle relative to the high pressure grooves 22. An outlet port 111 of a compressor unit 100 is in communication with the high pressure grooves 22 via a high pressure line 121 and a high pressure input port 61. An inlet port 112 of the compressor unit 100 is in communication with the low pressure groove 23 via a low pressure line 122 and a low pressure input port 62.

The second valve seat 3 is fixed to the housing. As shown in FIG. 17, the second valve seat 3 is formed with a second output passages 32 in the center. The second output passages 32 is in communication with a pulse tube port 312 of a pulse tube 302 via a pulse tube line 322 and a second output port 64. Two middle pressure passages 33, two auxiliary high pressure passages 36, and two auxiliary low pressure passages 37 are formed having rotational symmetry along an axis respectively on a common pitch circle on the second valve seat 3. A reservoir port 411 of a reservoir 401 is in communication with the middle pressure passages 33 via a reservoir line 421 and a middle pressure input port 65. A high pressure reservoir port 413 of the high pressure reservoir 403 is in communication with the auxiliary high pressure passages 36 via a high pressure reservoir line 423 and an auxiliary high pressure port 67. A low pressure reservoir port 414 of a low pressure reservoir 404 is in communication wit the auxiliary low pressure passages 37 via a low pressure reservoir line 424 and an auxiliary low pressure port 68.

The second valve element 4 contacting the second valve seat 3 is fixed to the shaft of the motor. As shown in FIG. 17, radial directional long groove 47 recessed by a predetermined depth from the center in the radial direction is formed on the second valve element 4.

The first valve element 2 and the second valve element 4 are pushed towards the first valve seat 1 and the second valve seat 3, respectively, by the pressure of the high pressure gas around the first valve element 2 and the second valve element 4 supplied to a high pressure groove of the first valve element 2.

The rotary valve unit 211 is generally actuated by the motor. When the shaft of the motor is rotated, the first valve element 2 slidably rotates in the direction shown with an arrow in FIG. 17 relative to the first valve seat 1, and the second valve element 4 is slidably rotated in the direction shown with an arrow in FIG. 17. Thus, the same operation as with the pulse tube refrigerator 614 can be achieved by the pulse tube refrigerator 624.

In the known pulse tube refrigerators 611, 612, 613 and 614, the first solenoid valve. 701, the second solenoid valve 702, the third solenoid valve 703, the fourth solenoid valve 704, the fifth solenoid valve 705, the sixth solenoid valve 706, the seventh solenoid valve 707 and the eight solenoid valve 708 which are used for switching the pressures generally include a solenoid coil for generating a magnetic field during energization, a movable metal core actuated by the magnetic force of the magnetic field, a valve seat that the movable metal core contacts and separates from, a coil spring for biasing the movable metal core towards the valve seat when deenergized, and a housing for accommodating the aforementioned members. The solenoid valve with the foregoing structure generates noise when the movable metal core collides with the housing in accordance during opening operation. Thus a loud noise is generated when a continuous operation for opening and closing the several solenoid valves are performed at one to several Hz. When the continuous operation is performed at one to several Hz, operation abnormalities are soon caused due to the fatigue of the coil spring and the heat of the solenoid coil portion. In addition, the movable metal core and the housing are worn due to the sliding of the movable metal core in the housing, and metal particles are generated to contaminate the compressor unit and the cooling unit. Particularly, contamination by the metal particles in the compressor unit causes critical breakdown of the compressor unit. Accordingly, the known pulse tube refrigerators 611, 612, 613 and 614 have drawbacks concerning the noisiness and low durability of the solenoid valves 701, 702, 703, 704, 705, 706, 709 and 708 used for switching the pressure.

On the other hand, since the rotary valve unit 211 supplied to the pulse tube refrigerator 624 operates silently because of the sliding valve, the foregoing noise problem is not caused. Also, by using a material with high wear resistance and with low frictional coefficient for the valve seat, the problem of durability is solved.

Ideally, the sliding plane of the valve seat and the sliding plane of the valve element in the rotary valve tightly contact each other so as not to leak gas from the sliding surfaces, a small amount of gas leakage (hereinafter referred as leakage along sliding surfaces) is generated by the differential pressure at the border between the sliding surfaces in actual operation. The equivalent of leakage along sliding surfaces between the sliding surfaces of the rotary valve unit 211 is schematically shown in a pulse tube refrigerator 624a of FIG. 18.

A first restriction 801 is the equivalent of leakage along sliding surfaces from around the first valve element 2 corresponding to leakage at the high pressure grooves 22 of the first valve element 2 towards the low pressure groove 23 of the first valve element 2. A second restriction 811 is the equivalent of leakage along sliding surfaces from around the first valve element 2 corresponding to leakage at the high pressure grooves 22 of the first valve element 2 towards the first output passages 12 of the first valve seat 1. A third restriction 812 is the equivalent to the leakage along sliding surfaces from the first output passages 12 of the first valve seat 1 towards the low pressure groove 23 of the first valve element 2. A fourth restriction 821 is the equivalent to the leakage along sliding surfaces from around the second valve element 4 towards the second output passages 32 of the second valve seat 3. A sixth restriction 823 is the equivalent to the leakage along sliding surfaces between the second output passages 32 of the second valve seat 3 and the middle pressure passages 33. A seventh restriction 825 is the equivalent to the leakage along sliding surfaces between the second output passages 32 of the second valve seat 3 and the auxiliary high pressure passages 36. An eighth restriction 826 is the equivalent to the leakage along sliding surfaces between the second output passages 32 of the second valve seat 3 and the auxiliary low pressure passages 37. A ninth restriction 831 is the equivalent to the leakage along sliding surfaces from around the second valve element 4 towards the middle pressure passages 33 of the second valve seat 3. An eleventh restriction 851 is the equivalent to the leakage along sliding surfaces from around the second valve element 4 towards the auxiliary high pressure passages 36 of the second valve seat 3. A twelfth restriction 861 is the equivalent to the leakage along sliding surfaces from around the second valve element 4 to the auxiliary low pressure passages 37 of the second valve seat 3.

The fourth restriction 821 is in communication with the second output port 64 and a high pressure input port 61. The sixth restriction 823 is in communication with the second output port 64 and with the high pressure input port 61 via the ninth restriction 831. The seventh restriction 825 is in communication with the second output port 64 and with the high pressure input port 61 via the eleventh restriction 851. The eighth restriction 826 is in communication with the second output port 64 and with the high pressure input port 61 via the twelfth restriction 861. Thus, all restrictions in communication with the output port 64 are in communication only with the high pressure input port 61. Accordingly, only flow of the leaked gas from the high pressure input port 61 to the second output port 64 is generated in accordance with the leakage along sliding surfaces corresponding to each restriction. On the other hand, since it is considered that the resistance of the second restriction 811 and the third restriction 812 are approximately the same, the leaked gas amount from the high pressure input port 61 to the first output port 63 due to the leakage along sliding surfaces and the leaked gas amount from the first output port 63 to the low pressure input port 62 due to the leakage along sliding surfaces are balanced. Because the gas pressure is balanced, the amount of the flowing gas is balanced. Accordingly, in the rotary valve unit 211, a flow of the gas leakage from a pulse tube port 312 of a pulse tube 302 to a regenerator port 311 of a regenerator 301 via a cold head 303 (hereinafter referred as unidirectional flow) is generated due to the leakage along sliding surfaces. Since heat is introduced from the pulse tube port 312 side to the cold head 303 via the pulse tube 302 in accordance with this unidirectional flow, the refrigeration capacity of the pulse tube refrigerator 624 is significantly deteriorated. Accordingly, even when the rotary valve unit 211 is used as the pressure switching mechanism instead of the known pulse tube refrigerators 611, 612, and 613, the refrigeration capacity may be significantly deteriorated compared the known pulse tub e refrigerator 624 having the rotary valve unit 211.

A need therefore exists for a rotary valve unit and a pulse tube refrigerator which is sufficiently quiet and durable, and restricts the generation of unidirectional flow for achieving high refrigeration efficiency.

SUMMARY OF THE INVENTION

In light of the foregoing, the present invention provides a rotary valve unit which includes a housing which has a high pressure input port in communication with an outlet port of a compressor unit, a low pressure input port in communication with an inlet port of the compressor unit, a first output port in communication with a regenerator, a second output port in communication with a pulse tube, and a middle pressure input port in communication with a reservoir. The rotary valve unit further includes a first rotary valve which has a first valve seat with a first sliding plane and a first valve element wit h a second sliding plane opposing to and contacting the first sliding plane. T he second sliding plane slidingly rotates relative to the first sliding plane by a rotation of the first valve element relative. to the first valve seat for establishing and interrupting communication between the high pressure input port and the first output port and for establishing and interrupting a communication between the low pressure input port and the first output port. The rotary valve unit further includes a second rotary valve which has a second valve seat with a third sliding plane and a second valve element with a fourth sliding plane opposing to and contacting the third sliding plane. The fourth sliding plane slidingly rotates relative to the third sliding plane by the rotation of the second valve element relative to the second valve seat for establishing and interrupting communication between the second output port and the middle pressure input port. Further, the rotary valve unit includes a motor disposed in the housing and having a shaft for synchronously rotating the first valve element and the second valve element, a recessed space formed in sliding surfaces between the third sliding plane and the fourth sliding plane, and a communication passage for communication between the recessed space and the low pressure input port.

According to another aspect of the invention, a pulse tube refrigerator includes a compressor unit in communication with the rotary valve unit, a regenerator in communication with the rotary valve unit, a pulse tube in communication with the rotary valve unit, a reservoir in communication with the rotary valve unit, and a rotary valve unit which has a housing having a high pressure input port in communication with an outlet port of the compressor unit, a low pressure input port in communication with an inlet port of the compressor unit, a first output port in communication with a regenerator, a second output port in communication with the pulse tube and a middle pressure input port in communication with the reservoir. The pulse tube refrigerator further includes a first rotary valve which has a first valve seat with a first sliding plane and a first valve element with a second sliding plane opposing to and contacting the first sliding plane. The second sliding plane slidingly rotates relative to the first sliding plane by a rotation of the first valve element relative to the first valve seat for establishing and interrupting communication between the high pressure input pert and the first output port and for establishing and interrupting communication between the low pressure input port and the first output port. The pulse tube refrigerator still further includes a second rotary valve which has a second valve seat with a third sliding plane and a second valve element with a fourth sliding plane opposing to and contacting the third sliding plane. The fourth sliding plane slidingly rotates relative to the third sliding plane by the rotation of the second valve element relative to the second valve seat for establishing and interrupting communication between the second output port and the middle pressure input port. Further, the pulse tube refrigerator includes a motor disposed in the housing, the motor comprising a shaft for synchronously rotating the first valve element and the second valve element, a recessed space formed in sliding surfaces between the third sliding plane and the fourth sliding plane, and a communication passage for communication between the recessed space and the low pressure input port.

BRIEF DESCRIPTION OF THE DRAWING

The foregoing and additional features and characteristics of the present invention will become more apparent from the following detailed description considered with reference to the accompanying drawing figures in which like reference numerals designate like elements and wherein.

FIG, 17 is an overview of a known rotary valve unit and a known pulse tube refrigerator.

DETAILED DESCRIPTION OF THE INVENTION

Embodiments of the present invention will be explained as follows.

First Embodiment

Figure 1:
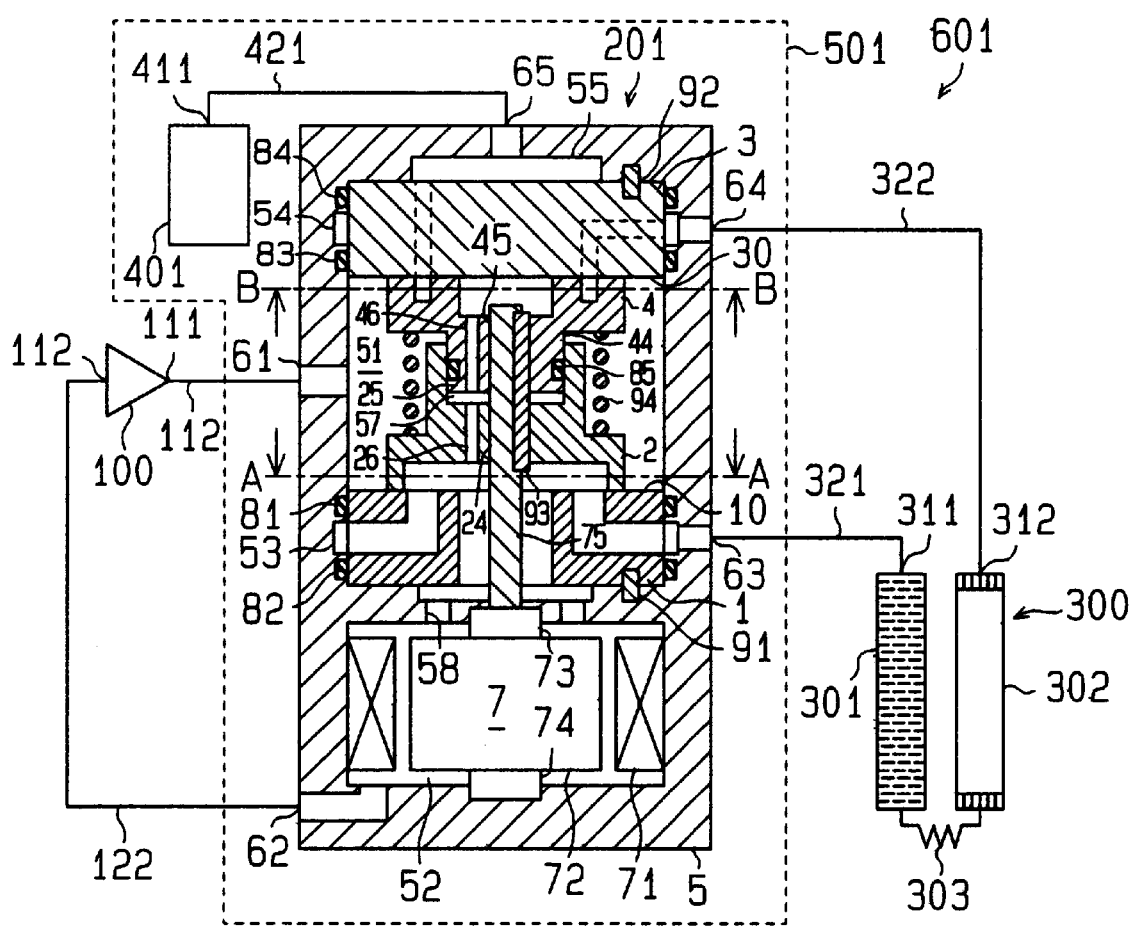
FIG. 1 is a cross-sectional view of a rotary valve unit and an overview of a pulse tube refrigerator applied with the rotary valve unit according to a first embodiment of the present invention

FIG. 1 shows a cross-sectional view of a rotary valve unit 201 and an overview of a pulse tube refrigerator 601 having the rotary valve unit 201 according to a first embodiment of the present invention. The rotary valve unit 201 provides a pressure switching mechanism using a sliding valve instead of the first solenoid valve 701, the second solenoid valve 702 and the third solenoid valve 703 of the known pulse tube refrigerator 611.

As shown in FIG. 1, the rotary valve unit 201 includes a housing 5, a motor 7 disposed in the housing 5, a first valve seat 1, a first valve element 2, a second valve seat 3 and a second valve element 4.

Referring to FIGS. 1–4, the housing 5 includes a high pressure input port 61, a low pressure input port 62, a first output port 63, a second output port 64, and a middle pressure input port 65. An outlet port 111 of a compressor unit 100 is in communication with the high pressure input port 61 via a high pressure line 121. An inlet port 112 of the compressor unit 100 is in communication with the low pressure input port 62 via a low pressure line 122. A regenerator port 311 of a regenerator 301 is in communication with the first output port 63 via a regenerator line 321. A pulse tube port 312 of a pulse tube 302 is in communication with the second output port 64 via a pulse tube line 322. And a reservoir port 411 of a reservoir. 401 is in communication with a middle pressure input port 65 via a reservoir line 421.

The motor 7 actuated by an external power source (not shown) includes a stator 71 fixed in the housing 5, a rotor 72 rotatably supported by a bearing 73 and a bearing 74 in the housing 5, and a shaft 75 for transmitting the rotational force of the rotor 72. A first low pressure space 52 in which the motor 7 is positioned is in communication with the low pressure input port 62.

Figure 2:
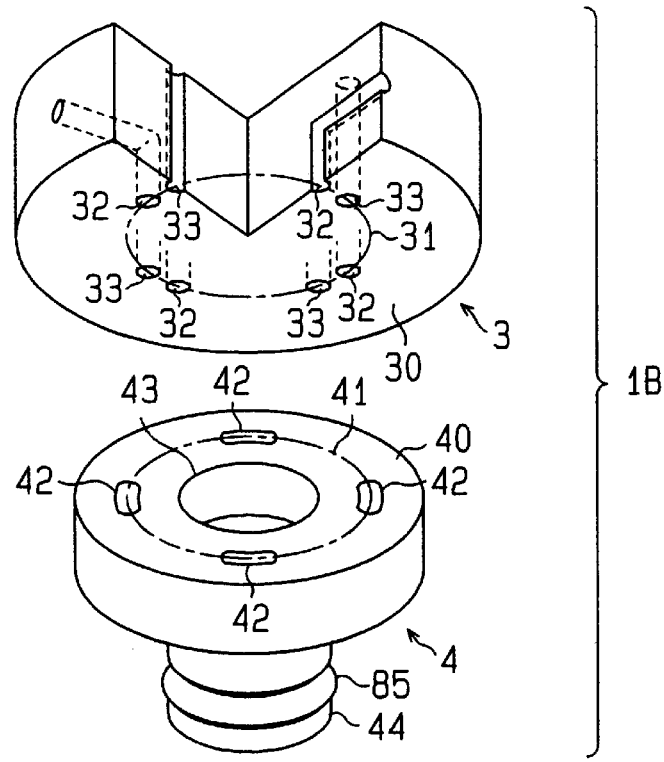
FIG. 2 is a perspective view showing a first valve seat, a first valve element, a second valve seat, and a second valve element respectively according to the first embodiment of the present invention.
Figure 2:
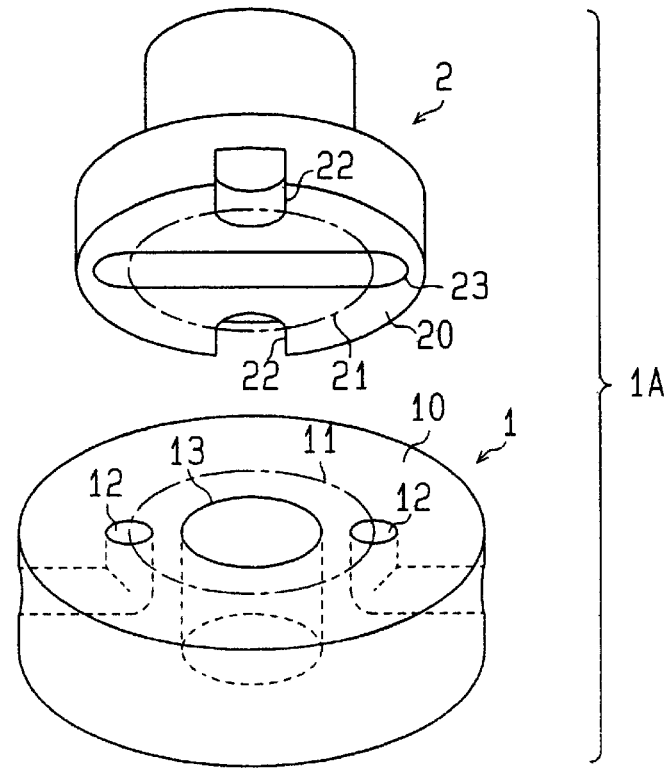
Figure 3:
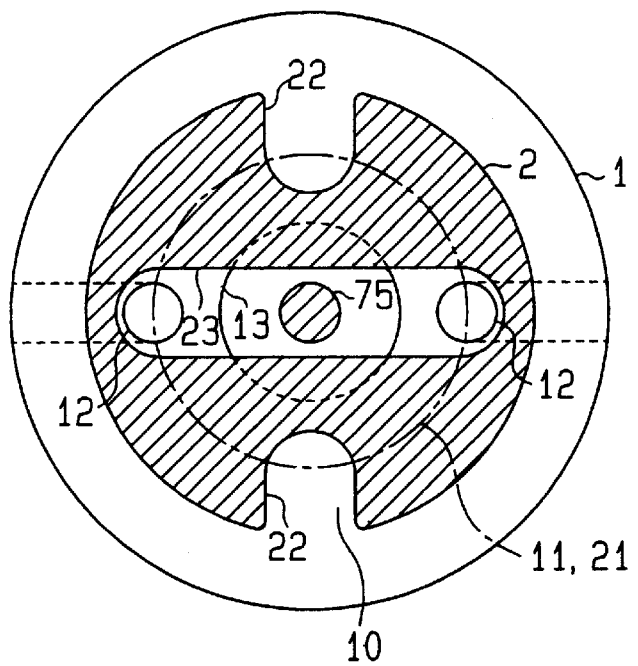
FIG. 3 is a cross sectional view showing the communication between the first valve seat and the first valve element taken on line 3—3 of FIG. 1.

The first valve seat 1 made of a material with low frictional coefficient such as polytetrafluoroethylene is formed in cylindrical shape. The first valve seat 1 includes a first sliding plane 10 on one end. The first sliding plane 10 is positioned to face upward in FIG. 1 and is fixed to the housing 5 to be perpendicular to the shaft 75 by a pin 91. As shown in FIGS. 2 and 3, two first output passages 12 are formed with rotational symmetry on a first pitch circle 11 concentric with the axis of the shaft 75 on the first sliding plane 10. A first center hole 13 is formed in the center of the first sliding plane 10. The first output passages 12 have openings on the cylindrical surface of the first valve seat 1, to be in a communication with the first output port 63 via a first annular output space 53 formed around the cylindrical surface of the valve seat 1. The first center hole 13 is in communication with the low pressure input port 62 via a first low pressure passage 58 and the first low pressure space 52. The shaft 75 penetrates the first center hole 13 without contact.

The first valve element 2, made of hard material such as heat treated stainless steel, has a stepped cylindrical shape. The first valve element 2 includes a second sliding plane 20 on an end which has a larger diameter. The second sliding plane 20 is positioned opposing the first sliding plane 10 of the first valve seat 1 for contact therewith. The shaft 75 is fitted into a first fitting hole 24 formed on the first valve element 2 and fixed with a key 93. As shown in FIGS. 2 and 3, two high pressure grooves 22 formed with rotational symmetry on the first valve element 2 are recessed from the cylindrical surface by a predetermined depth, cross a second pitch circle 21 having the same diameter as the first pitch circle 11 of the first valve seat 1, and are concentric with the axis of the shaft 75. A low pressure groove 23 on the first valve element 2 crosses the center of the first valve element 2 and the second pitch circle 21 with a predetermined depth, and extends at a right angle relative to the high pressure grooves 22. The high pressure grooves 22 have openings to a high pressure space 5 in communication with the high pressure input port 61. The low pressure groove 23 communicates with the first center hole 13 of the first valve seat 1, and so with the low pressure input port 62 via the first low pressure passage 58 and the first low pressure space 52. A second fitting hole 25 with a predetermined depth is formed in the center on an end of the first valve element 2 having a smaller diameter, opposite to the sliding surface 20 on the first valve element 2. The second fitting hole 25 is in communication with the first center hole 13 via the second low pressure passage 26 formed in the first valve element 2.

Figure 4:
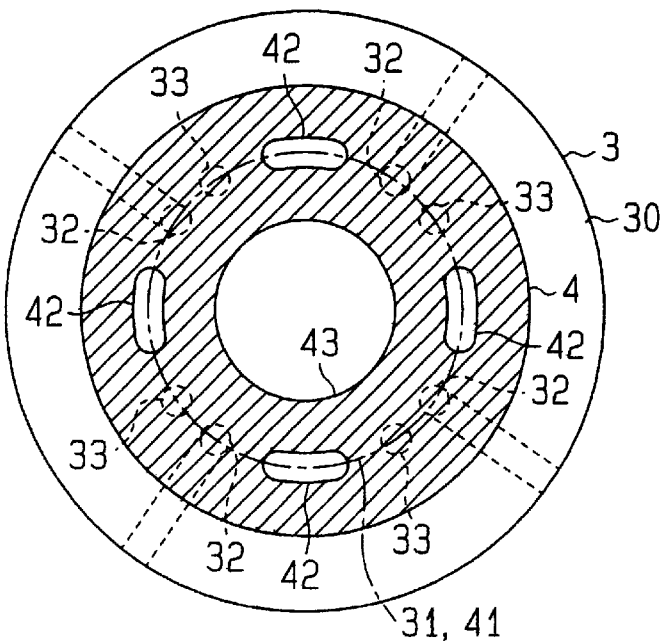
FIG. 4 is a cross-sectional view showing the communication between the second valve seat and the first valve element taken on line 4—4 of FIG. 1.

The second valve seat 3, like the first valve seat 1, is made of a material with low frictional coefficient such as polytetrafluoroethylene and is formed in cylindrical shape. The second valve seat 3 includes a third sliding plane 30 on one end. The third sliding plane 30 is positioned opposing the first valve seat 1 while keeping a predetermined distance from the first sliding plane 10 of the first valve seat 1, and is fixed to the housing 5 perpendicular to the shaft 75 by a pin 92. As shown in FIGS. 2 and 4, four second output passages 32 are formed with rotational symmetry on a third pitch circle 31 sharing a common center with axis of the shaft 75 on the third sliding plane 30. Four middle pressure passages 33 are formed on the third pitch circle 31 with a predetermined central angle relative to the second output passages 32, respectively. The second output passages 32 have openings to the cylindrical surface to be in communication with the second output port 64 via a second annular output space 54 formed around the cylindrical surface. The middle pressure passages 33 have openings penetrating to the opposite side of the second valve seat 3 to be in communication with the middle pressure input port 65 via a middle pressure space 55.

The second valve element 4, like the first valve element 2, is made of hard material such as heat treated stainless steel, and is formed in a stepped cylindrical shape. The second valve element 4 includes a fourth sliding plane 40 on an end having a larger diameter. The fourth sliding plane 40 is positioned opposing the third sliding plane 30 of the second valve seat 3 for contact therewith. A fitting shaft 44 provided on the other end of the second valve element 4 having a smaller diameter is fitted to the second fitting hole 25 of the first valve element 2 to form a second low pressure space 57. The shaft 75 is fitted in a third fitting hole 45 formed on the second valve element 4 to be fixed with a key 93. As shown in FIGS. 2 and 4, four arc shaped grooves 42 recessed with a predetermined depth with angles equal to the central angle subtended at the center by a cord of the second output passages 32 and the middle pressure passages 33 are formed on the third sliding plane 30 of the second valve seat 3 are formed with rotational symmetry on a fourth pitch circle 41 having the same diameter with the third pitch circle 31 of the second valve seat 3 concentric with the axis of the shaft 75. A second center hole 43 having a predetermined depth is formed in the center of the fourth sliding plane 40 of the second valve element 4. The second center hole 48 is in communication with the second low pressure space 57 via a third low pressure passage 46 formed in the second valve element 4. The second low pressure space 57 is in communication with the first center hole 13 of the first valve seat 1 via the second low pressure passage 26 formed on the first valve element 2. Accordingly, like the first center hole 13, the second center hole 43 is in communication with the low pressure input port 62.

The first output space 53 and the high pressure space 51 are gas-tightly separated by an O-ring 81. The first output space 53 and the first low pressure space 52 are gas-tightly separated by an O-ring 82. The second output space 54 and the high pressure space 51 are gas-tightly separated by an O-ring 83. The second output space 54 and the middle pressure space 55 are gas-tightly separated by an O-ring 84. And the second low pressure space 57 and the high pressure space 51 are gas-tightly separated by an O-ring 85.

The first valve element 2 and the second valve element 4 are pushed to the first valve seat 1 and the second valve seat 3, respectively, by the pressure of the high pressure gas of the high pressure space 51 and the biasing force of a coil spring 94 provided therebetween. Accordingly, the first sliding plane 10 of the first valve seat 1 and the second sliding plane 20 of the first valve element 2 tightly contact each other, and the third sliding plane 30 of the second valve seat 3 and the fourth sliding plane 40 of the second valve element 4 tightly contact each other.

The rotary valve unit 201 is actuated by the motor 7. The first valve element 2 and the second valve element 4 are synchronously rotated by the rotation of the rotor 72 and the shaft 75. Accordingly, the first valve element 2 slidably rotates relative to the first valve seat 1 and the second valve element 4 slidably rotates relative to the second valve seat 3. A first rotary valve 1A is formed by the first valve seat 1 and the first valve element 2. By slidably rotating the first valve element 2 relative to the first valve seat 1, switching for establishing and interrupting the communication between the high pressure input port 61 and the first output port 63, and switching for establishing and interrupting the communication between the low pressure input port 62 and the first output port 63, are performed. A second rotary valve 1B is formed by the second valve seat 3 and the second valve element 4. By slidably rotating the second valve element 4 relative to the second valve seat 3, switching for establishing and interrupting communication between the middle pressure input port 65 and the second output port 64 is performed. The motor 7 can be rotated in either a clockwise direction or counterclockwise direction as viewed from the top of the shaft 75.

In the first embodiment, three communication patterns between each port of the rotary valve unit 201 are achieved as follows:

1. A condition in which the communication between the high pressure input port 61 and the first output port 63 is established because the high pressure grooves 22 of the first valve element 2 meets the first output passages 12 of the first valve seat 1 (hereinafter referred as a first communication condition).

2. A condition in which the communication between the low pressure input port 62 and the first output port 63 is established because the low pressure groove 23 of the first valve element 2 meets the first output passage 12 (hereinafter referred as a second communication condition).

3. A condition in which the communication between the second output passages 32 and the middle pressure passages 33 and the communication between the second output port 64 and the middle pressure input port 65 are established because the arc shaped grooves 42 of the second valve element 4 meet both the second output passages 32 of the second valve seat 3 and the middle pressure passages 33 simultaneously (hereinafter referred as a third communication condition).

The aforementioned communication conditions are repeated in order of the third communication condition, the first communication condition, the third communication condition and the second communication condition as one cycle without overlapping one another. The second communication condition is shown in FIGS. 3 and 4.

An actual operation of the pulse tube refrigerator 601 having the rotary valve unit 201 of the first embodiment will be explained as follows. In this case, the pressure of the outlet port 11 of the compressor unit 100 is determined to be a high pressure PH, the pressure of the inlet port 112 of the compressor unit 100 is determined to. be a low pressure PL and the pressure in the reservoir 401 is determined to be a middle pressure PM. The high pressure PH is determined to be higher than the middle pressure and the middle pressure is determined to be higher than the low pressure (i.e., PH>PM>PL).

First, in the third communication condition of the rotary valve unit 201, the gas in the reservoir 401 is supplied to a space of the pulse tube port 312 side of the pulse tube 302 to increase the pressure of the pulse tube 302 and the regenerator 301 from the low pressure PL corresponding to the pressure of the inlet port 112 of the compressor unit 100 to the middle pressure PM corresponding to the pressure of the reservoir 401.

Second, when the first valve element 2 and the second valve element 4 are rotated by a predetermined angle from the aforementioned condition relative to the first valve seat 1 and the second valve seat 2, and the rotary valve unit 201 assumes the first communication condition, the high pressure gas which is compressed and radiated in the compressor unit 100 is cooled down in the regenerator 301 and supplied to a space of the cold head 303 side of the pulse tube 302 to increase the pressure of the regenerator 301 and the pulse tube 302 from the middle pressure PM corresponding to the pressure in the reservoir 401 to the high pressure PH corresponding to the outlet port 111 of the compressor unit 100.

Third, when the first valve element 2 and the second valve element 4 are rotated by a predetermined angle from the foregoing condition relative to the first valve seat 1 and the second valve seat 3, and the rotary valve unit 201 assumes the third condition again, the gas in the pulse tube port 312 side of the pulse tube 302 is returned to the reservoir 401 to decrease the pressure of the pulse tube 302 and the regenerator 301 from the high pressure PH corresponding to the pressure of the outlet port 111 of the compressor unit 100 to the middle pressure PM corresponding to the pressure of the reservoir 401. In this case, the gas temperature of the space of the cold head 303 side of the pulse tube 302 becomes lower than the temperature of the cold head 303 due to adiabatic expansion.

Finally, when the first valve element 2 and the second valve element 4 are rotated by a predetermined angle from the foregoing condition relative to the first valve seat 1 and the second valve seat 3 and the state of the rotary valve unit 201 is switched from the third communication condition to the second communication condition, the gas is returned to the compressor unit 100 to decrease the pressure of the regenerator 301 and the pulse tube 302 from the middle pressure PM corresponding to the pressure of the reservoir 401 to the low pressure PL corresponding to the inlet port 112 of the compressor unit 100. In this case, the gas temperature of the cold head 303 side of the pulse tube 302 is further lowered by the adiabatic expansion. The gas with lowered temperature is returned to the compressor unit 100 while cooling down the cold head 303 and the regenerator 301.

The foregoing cycle is defined as one cycle. By repeating the cycle with a frequency of one to several Hz, a cryogenic temperature is generated at the cold head 303. According to the first embodiment, since each passage of each valve seat and each groove of each valve element are formed with double rotational symmetry having the shaft 75 as an axis, the aforementioned cycle is repeated twice while the shaft 75 rotates once, that is, while each valve element rotates once relative to each valve seat. Each passage of each valve seat and each groove of each valve element may be formed with triple rotational symmetry. In this case, the aforementioned cycle is repeated three times while each valve element rotates once relative to each valve seat. Generally, each passage of each valve seat and each groove of each valve element may be formed with N times rotational symmetry. In this case, the aforementioned cycle is repeated N times while each valve element rotates once relative to each valve seat.

According to the pulse tube refrigerator 601 having the rotary valve unit 201 of the first embodiment, since a sliding valve is used, the rotary valve unit 201 operates silently without generating noise like the solenoid valve. Since polytetrafluoroethylene, which is the material forming the first valve seat 1 and the second valve seat 3, has a small frictional coefficient and high durability relative to the heat treated stainless steel used as the material of the first valve element 2 and the second valve element 4, the first vale seat 1 and the second valve seat 3 are hardly worn out after long term operation with a frequency of one to several Hz of rotation of motor 7. Thus, the problem of durability is not raised.

Figure 5:
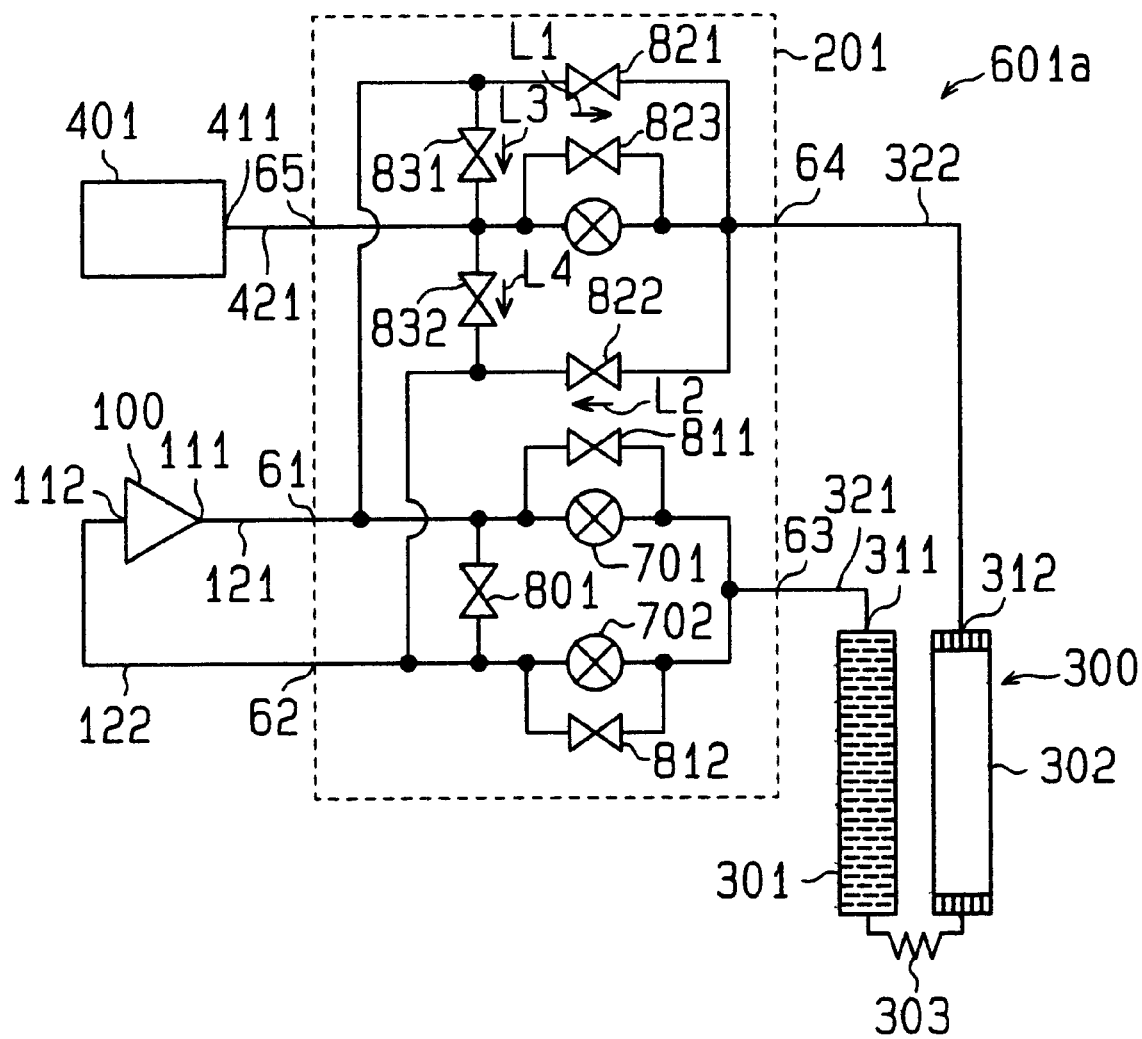
FIG. 5 is a view schematically showing the leakage along sliding surfaces of the rotary valve unit of the pulse tube refrigerator according to the first embodiment of the present invention.

FIG. 5 schematically shows the leakage along sliding surfaces of the rotary valve unit 201 according to the pulse tube refrigerator 601 having the rotary valve unit 201 of the first embodiment. As shown in FIG. 5, a first restriction 801 corresponds to the leakage along sliding surfaces from the high pressure space 51 including the high pressure grooves 22 of the first valve element 2 towards the first center hole 13 of the first valve seat 1 including the low pressure groove 23 of the first valve element 2. A second restriction 811 corresponds to the leakage along sliding surfaces from the high pressure space 51 including the high pressure grooves 22 of the first valve element 2 to the first output passage 12 of the first valve seat 1. A third restriction 812 corresponds to the leakage along sliding surfaces from the first output passages 12 of the first valve seat 1 to the first center hole 13 of the first valve seat 1 including the low pressure groove 23 of the first valve element 2. A fourth restriction 821 corresponds to the leakage along sliding surfaces from the high pressure space 51 to the second output passage 32 of the second valve seat 3. A fifth restriction 822 corresponds to the leakage along sliding surfaces from the second output passages 32 of the second valve seat 3 to the second valve hole 43 of the second valve element 4. A sixth restriction 823 corresponds to the leakage along sliding surfaces between the second output passages 32 of the second valve seat 3 and the middle pressure passages 33. A ninth restriction 831 corresponds to the leakage along sliding surfaces from the high pressure space 51 to the middle pressure passages 33 of the second valve seat 3. A tenth restriction 832 corresponds to the leakage along sliding surfaces from the middle pressure passages 33 of the second valve seat 3 to the second hole 43 of the second valve element 4.

As mentioned above, the fourth restriction 821 shows the leakage along sliding surfaces from the high pressure space 51 in communication with the high pressure input port 61 to the second output passages 32 in communication with the second output port 64 between the sliding surfaces of the third sliding plane 30 and the fourth sliding plane 40. The leakage along sliding surfaces there is caused by the differential pressure between the high pressure input port 61 (i.e., always kept at high pressure PH) and the second output port 64 (i.e., the middle pressure PM on average). The fifth restriction 822 shows the leakage along sliding surfaces from the second output passages 32 in communication with the second output port 64 to the second center hole 43 between the sliding surfaces of the third sliding plane 30 and the fourth sliding plane 40. The second center hole 43 is in communication with the low pressure port 62 via the third low pressure passage 46, the second low pressure passage 26, the first center hole 13 and the first low pressure passage 58. The leakage along sliding surfaces of the fifth restriction 822 is caused by the differential pressure between the second output port 64 (i.e., the middle pressure PM on average) and the low pressure input port 62 (i.e., always low pressure PL).

When the differential pressure between the high pressure PH and the middle pressure PM and the differential pressure between the middle pressure PM and the low pressure PL are equal, the following occurs. That is, when the leakage (i.e., the leakage from the high pressure space 51 to the second output passages 32) corresponding to the fourth restriction 821 is generated between the sliding surfaces of the third sliding plane 30 and the fourth sliding plane 40 based on the differential pressure between the high pressure PH and the middle pressure PM, the leakage (i.e., the leakage from the second output passages 32 to the second center hole 43) corresponding to the fifth restriction 822 is generated based on the differential pressure between the middle pressure PM and the low pressure PL. Thus, a leaked amount L1 from the fourth restriction 821 and leaked amount L2 from the fifth restriction 822 are balanced. The leaked gas from the high pressure space 51 to the second output passage 32 flows to the low pressure input port 62 via the second center hole 43.

Accordingly, the flow of the leaked gas from the second output port 64 to the pulse tube 302 side can be prevented.

When the differential pressure between the high pressure PH and the middle pressure PM and the differential pressure between the middle pressure PM and the low pressure PL are not equal, the leaked amount L1 and the leaked amount L2 are not equal. However, even in this case, a part of the leaked amount L1 corresponding to the leaked amount L2 is returned to the inlet port 112 of the compressor 100 via the fifth restriction 822 and the remainder corresponding to L1–L2 is leaked to the second output port 64. Accordingly, the amount of the gas leakage to the second output port 64 can be reduced.

The ninth restriction 831 shown the leakage along sliding surfaces from the high pressure space 51 in communication with the high input port 61 to the middle pressure passages 33 in communication with the middle pressure input port 65 between the sliding surfaces of the third sliding plane 30 and the fourth sliding plane 40. This leakage is caused by the differential pressure between the high pressure input port 61 (i.e., always kept at high pressure PH) and the middle pressure input port 65 (i.e., always middle pressure PM). The tenth restriction 832 shows the leakage along sliding surfaces from the middle pressure passages 33 in communication with the middle pressure input port 65 to the second center hole 43 in communication with the low pressure input port 62 between the sliding surfaces of the third sliding plane 30 and the fourth sliding plane 40. This leakage is caused by the differential pressure between the middle pressure input port 65 (i.e., always middle pressure PM) and the low pressure input port 62 (i.e., always low pressure PL). Accordingly, when the leakage (i.e., the leakage from the high pressure space 51 to the middle pressure passages 33) corresponding to the ninth restriction 831 is generated between the third sliding plane 30 and the fourth sliding plane 40, based on the differential pressure between the high pressure PH and the middle pressure PM, the leakage (i.e., the leakage from the middle pressure passages 33 to the second center hole 43) corresponding to the tenth restriction 832 is generated based on the differential pressure between the middle pressure PM and the low pressure PL. Thus, a leaked amount L3 from the ninth restriction 831 and a fourth leaked amount L4 from the tenth restriction 832 are balanced. Accordingly, the undesirable increase of the reservoir pressure due to the gas leakage from the middle input port 65 to the reservoir 401 can be prevented.

According to the first embodiment, the second center hole 43 is formed on the fourth sliding plane 40 side as a recessed space in the sliding surfaces between the third sliding plane 30 and the fourth sliding plane 40. Since the second center hole 43 is in communication with the low pressure input port 62 via a communication passage (i.e., corresponding to the third low pressure passage 46, the second low pressure passage 26, the first center hole 13, and the first low pressure passage 58), the leakage between the sliding surfaces of the third sliding plane 30 and the fourth sliding plane 40 can be introduced to the low pressure input port 62 with low pressure. Accordingly, leakage amount from the high pressure input port 61 side having high pressure to the second output port 64 side (i.e., pulse tube 302 side) having middle pressure and the leaked amount from the second output port 64 (i.e., pulse tube 302 side) side having middle pressure to the low pressure input port 62 side having low pressure can be balanced to prevent the flow of leaked gas from the second output port 64 to the pulse tube 302 side. Accordingly, the generation of unidirectional flow of the leaked gas in the pulse tube refrigerator 601 can be prevented, to contribute to the improvement of the refrigeration efficiency of the pulse tube refrigerator 601.

The rotary valve unit 201 and the reservoir 401 may be fixed to a common member to form a unit and may form a rotary valve unit 501 with reservoir in the pulse tube refrigerator 601. Thus the pulse tube refrigerator 601 can have three units including the compressor unit 100, the rotary valve unit 501 with the reservoir 401, and a cooling unit 300 including the regenerator 301, the pulse tube 302 and the cold head 303. A self sealing joint having a built-in check valve on an end, which is automatically opened when connected and automatically closed when separated, may be applied at a joint of the output port 111 and the high pressure line 121, at the joint of the high pressure line 121 and the high pressure input port 61, the joint of the inlet port 112 and the low pressure line 122, at the joint of the low pressure line 122 and the low pressure input port 62, at the joint of the first output port 63 and the regenerator line 321, at the regenerator line 321 and the regenerator port 311, at the second output port 64 and the pulse tube line 322, and at the joint of the pulse tube line 322 and the pulse tube port 312 in the pulse tube refrigerator 601. A flexible tube may be applied to the high pressure line 121, the low pressure line 122, the regenerator line 321, and the pulse tube line 322. Accordingly, installation and maintenance become easy.

Second Embodiment

Figure 6:
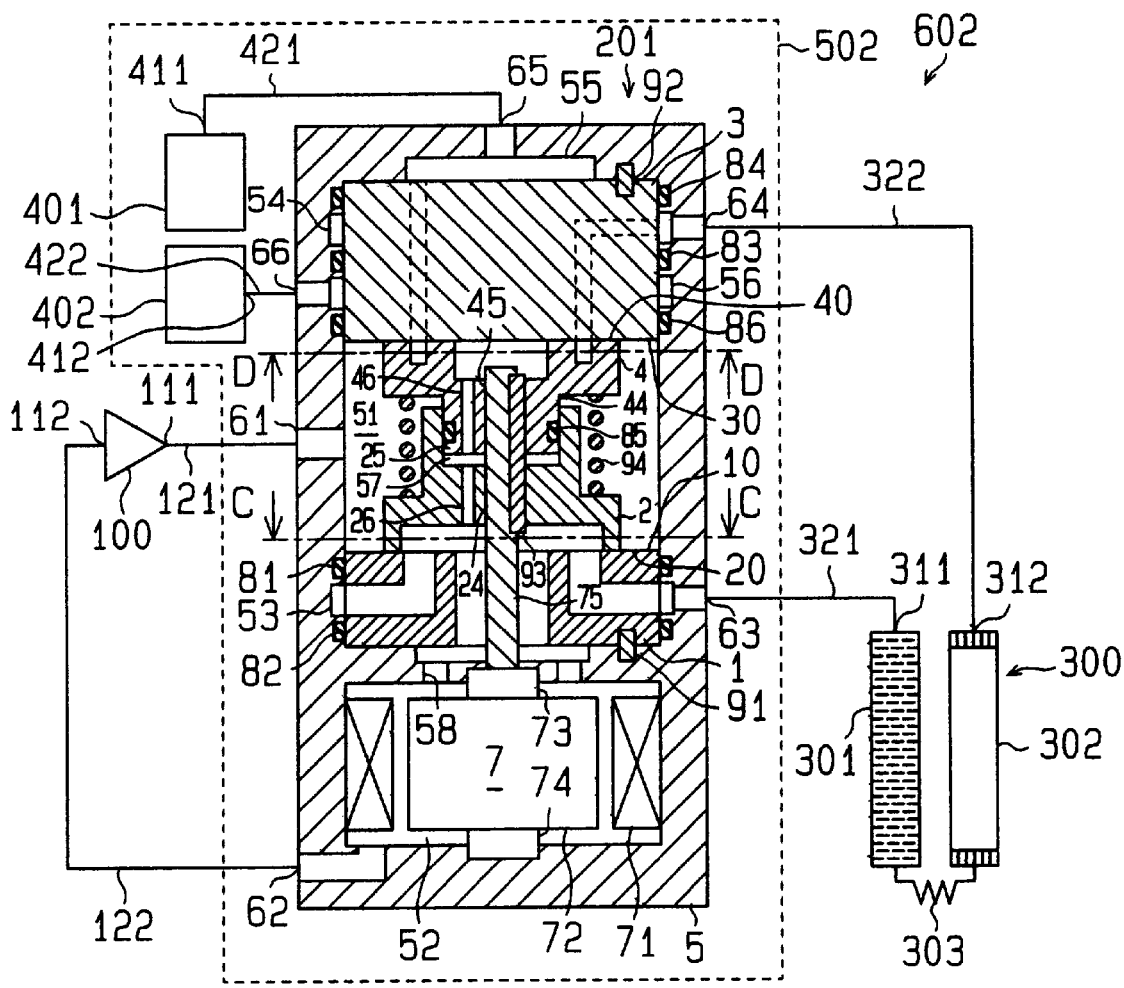
FIG. 6 is a cross-sectional view of a rotary valve unit and an overview of a pulse tube refrigerator applied with the rotary valve unit according to a second embodiment of the present invention.

FIG. 6 shows a cross-sectional view of a rotary valve unit 202 and an overview of a pulse tube refrigerator 602 having a rotary valve unit 202 according to a second embodiment of the present invention. The rotary valve unit 202 has a pressure switching mechanism using a sliding valve instead of the first solenoid valve 701, the second solenoid valve 702, the third solenoid valve 703 and the fourth solenoid valve 704 of known pulse tube refrigerator 612.

As shown in FIG. 6, the rotary valve unit 202 includes a housing 5, a motor 7 disposed in the housing 5, a first valve seat 1, a first valve element 2, a second valve seat 3, and a second valve element 4.

Figure 7:
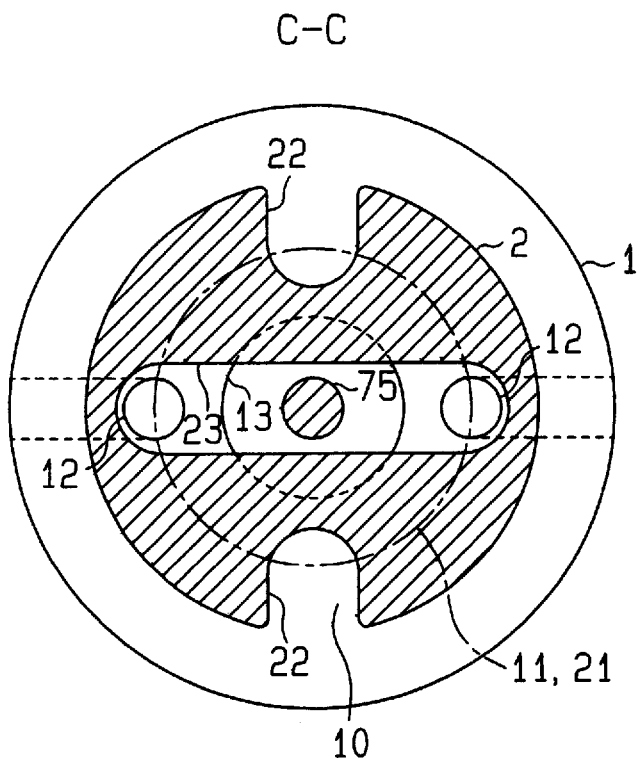
FIG. 7 is a cross-sectional view showing a communication between a first valve seat and a first valve element taken on line 7—7 of FIG. 6.
Figure 8:
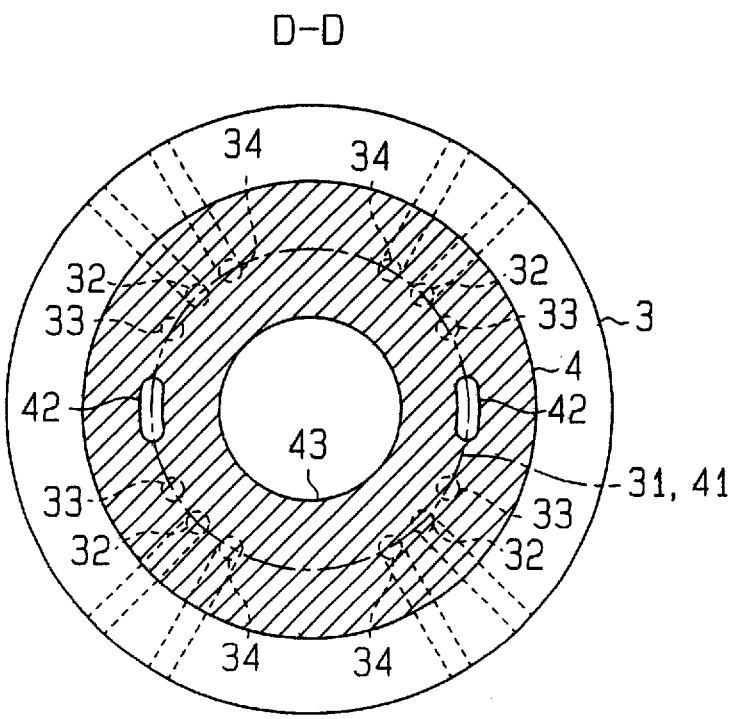
FIG. 8 is a cross-sectional view showing a communication between a second valve seat and a second valve element taken on line 8—8 of FIG. 6.

Referring to FIGS. 6–8, the housing 5 includes a high pressure input port 61, a low pressure input port 62, a first output port 63, a second output port 64, a middle pressure input port 65 and an auxiliary middle pressure input port 66. An outlet port 111 of a compressor unit 100 is in communication with the high pressure input port 61 via a high pressure line 121. An inlet port 112 of the compressor unit 100 is in communication with the low pressure input port 62 via a low pressure line 122. A regenerator port 311 of a regenerator 301 is in communication with the first output port 63 via a regenerator line 321. A pulse tube port 312 of a pulse tube 302 is in communication with the second output port 64 via a pulse tube line 322. A reservoir port 411 of a reservoir 401 is in communication with a middle pressure input port 65 via a reservoir line 421. And an auxiliary reservoir port 412 of the auxiliary reservoir 402 is in communication with the auxiliary middle pressure input port 66 via an auxiliary reservoir line 422.

The motor 7 actuated by an external power source (not shown) includes a stator 71 fixed in the housing 5, a rotor 72 rotatably supported by a bearing 73 and a bearing 74 in the housing 5 and a shaft 75 for transmitting the rotational force of the rotor 72. A first low pressure space 52 in which the motor 7 is positioned is in communication with the low pressure input port 62.

The first valve seat 1 made of a material with low frictional coefficient such as polytetrafluoroethylene is formed in cylindrical shape. The first valve seat 1 includes a first sliding plane 10 on one end. The first sliding plane 10 is positioned to face upward in FIG. 1 and is fixed to the housing 5 perpendicular to the shaft 75 by a pin 91. As shown in FIG. 7, two first output passages 12 are formed with rotational symmetry on a first pitch circle 11 concentric with the axis of the shaft 75 on the first sliding plane 10. A first center hole 13 is formed in the center of the first sliding plane 10. The first output passages 12 have openings to the cylindrical surface of the first valve seat 1 to be in communication with the first output port 63 via a first annular output space 53 formed around the cylindrical surface of the valve seat 1. The first center hole 13 is in communication with the low pressure input port 62 via a first low pressure passage 58 and the first low pressure space 52. The shaft 75 penetrates the first center hole 13 without contact.

The first valve element 2 made of hard material, such as heat treated stainless steel, has a stepped cylindrical shape. The first valve element 2 includes a second sliding plane 20 on an end which has a larger diameter. The second sliding plane 20 is positioned opposing the first sliding plane 10 of the first valve seat 1 for contact therewith. The shaft 75 is fitted into a first fitting hole 24 formed on the first valve element 2 to be fixed with a key 93. As shown in FIG. 7, two high pressure grooves 22 recessed from the cylindrical surface by a predetermined depth cross a second pitch circle 21 concentric with the axis of the shaft 75, have the same diameter as the first pitch circle 11 of the first valve seat 1 and are formed with rotational symmetry relative to each other on the first valve element 2. A low pressure groove 23 crossing the center of the first valve element 2 and the second pitch circle 21, with a predetermined depth, is formed at a right angle relative to the high pressure grooves 22 on the first valve element 2. The high pressure grooves 22 have openings to a high pressure space 51 in communication with the high pressure input port 61. The low pressure groove 23 has an opening to the first center hole 13 of the first valve seat 1 to be in communication with the low pressure input port 62 via the first low pressure passage 58 and the first low pressure space 52. A second fitting hole 25 with a predetermined depth is formed in the center on an end having a smaller diameter opposite to the sliding surface 20 on the first valve element 2. The second fitting hole 25 is in communication with the first center hole 13 via the second low pressure passage 26 formed in the first valve element 2.

The second valve seat 3, like the first valve seat 1, made of a material with a low frictional coefficient such as polytetrafluoroethylene, is formed in a cylindrical shape. The second valve seat 3 includes a third sliding plane 30 on one end. The third sliding plane 30 is positioned opposing the first valve seat while keeping a predetermined distance from the first sliding plane 10 of the first valve seat 1, and is fixed to the housing 5 perpendicular to the shaft 75 by a pin 92. As shown in FIG. 8, four second output passages 32 are formed with rotational symmetry on a third pitch circle 31 sharing a common center with axis of the shaft 75 on the third sliding plane 30. Four middle pressure passages 33 are formed on the third pitch circle 31 with a predetermined central angle relative to the second output passages 32, respectively. Four auxiliary middle pressure passages 34 are formed on the third pitch circle 31 and opposite the middle pressure passages 33 relative to the second output passages 32, respectively having the same central angle with the central angle subtended at the center by a cord of the respective second output passages 32 and the middle pressure passages 33. The second output passages 32 have openings to cylindrical surface to be in communication with the second output port 64 via a second annular output space 54 formed around the cylindrical surface. The middle pressure passages 33 have openings penetrating to the opposite side of the second valve seat 3 to be in communication with the middle pressure input port 65 via a middle pressure space 55. The auxiliary middle pressure passages 34 have openings to the cylindrical surface to be in communication with the auxiliary middle pressure input port 66 via an auxiliary annular middle pressure space 56 formed around the cylindrical surface.

The second valve element 4, like the first valve element 2, made of hard material such as heat treated stainless steel, is formed in stepped cylindrical shape. The second valve element 4 includes a fourth sliding plane 40 on an end having a larger diameter. The fourth sliding plane 40 is positioned to oppose the third sliding plane 30 of the second valve seat 3 for contact therewith. A fitting shaft 44 provided on the other end of the second valve element 4 having a smaller diameter is fitted to the second fitting hole 25 of the first valve element 2 to form a second low pressure space 57. The shaft 75 is fitted into a third fitting hole 45 formed on the second valve element 4 to be fixed with a key 93. As shown in FIG. 8, two arc shaped grooves 42 recessed with a predetermined depth with angles equal to the central angle subtended at the center by a cord of the second output passages 32 and the middle pressure passages 33 are formed on the third sliding plane 30 of the second valve seat 3 are formed with rotational symmetry on a fourth pitch circle 41 having the same diameter as the third pitch circle 31 of the second valve seat 3 concentric with the axis of the shaft 7. A second center hale 43 having a predetermined depth is formed in the center of the fourth sliding plane of the second valve element 4. The second center hole 43 is in communication with the second low pressure space 57 via a third low pressure passage 46 formed in the second valve element 4. The second low pressure space 57 is in communication with the first center hole 13 of the first valve seat 1 via the second low pressure passage 26 formed on the first valve element 2. Accordingly, like the first center hole 13, the second center hole 43 is in communication with the low pressure input port 62.

The first output space 53 and the high pressure space 51 are gas-tightly separated by an O-ring 81. The first output space 53 and the first low pressure space 52 are gas-tightly separated by an O-ring 82. The auxiliary middle pressure space 56 and the high pressure space 51 are gas-tightly separated by an O-ring 86. The second output space 54 and the auxiliary space 56 are gas-tightly separated by an O-ring 83. The second output space 54 and the middle pressure space 55 are gas-tightly separated by an O-ring 84. And the second low pressure space 57 and the high pressure space 51 are gas-tightly separated by an O-ring 85. The first valve element 2 and the second valve element 4 are pushed to the first valve seat 1 and the second valve seat 3, respectively, by the pressure of the high pressure gas of the high pressure space 51 and the biasing force of a coil spring 94 provided therebetween.

Accordingly, the first sliding plane 10 of the first valve seat 1 and the second sliding plane 20 of the first valve element 2 are tightly contacted each other, and the third sliding plane 30 of the second valve seat 3 and the fourth sliding plane 40 of the second valve element 4 are tightly contacted each other.

The rotary valve unit 201 is actuated by the motor 7. The first valve element 2 and the second valve element 4 are synchronously rotated by the rotation of the rotor 72 and the shaft 75. Accordingly, the first valve element 2 slidably rotates relative to the first valve seat 1 and the second valve element 4 slidably rotates relative to the second valve seat 3. A first rotary valve 1A is formed by the first valve seat 1 and the first valve element 2. By slidably rotating the first valve element 2 relative to the first valve seat 1, switching for establishing and interrupting communication between the high pressure input port 61 and the first output port 63 and the switching for establishing and interrupting the communication between the low pressure input port 62 and the first output port 63 are performed. A second rotary valve 1B is formed by the second valve seat 3 and the second valve element 4. By slidably rotating the second valve element 4 relative to the second valve seat 3, the switching for establishing and interrupting the communication between the middle pressure input port 65 and the second output port 64 and the switching for establishing and interrupting the communication between the second output port 64 and the auxiliary middle pressure input port 66 are performed. The motor 7 can be rotated in either a clockwise direction or a counterclockwise direction viewed from the top of the shaft 75.

In the second embodiment, four communication patterns between each port of the rotary valve unit 201 are achieved as follows:

1. A condition in which the communication between the high pressure input port 61 and the first output port 63 is established because the high pressure grooves 22 of the first valve element 2 meets the first output passages 12 of the first valve seat 1 (hereinafter referred as a first communication condition).

2. A condition in which the communication between the low pressure input port 62 and the first output port 63 are established because the low pressure groove 23 of the first valve element 2 meets the first output ports 12 (hereinafter referred as a second communication condition).

3. A condition in which the communication between the second output passages 32 and the middle pressure passages 33, and the communication between the second output port 64 and the middle pressure input port 65 are established because the arc shaped grooves 42 of the second valve element 4 meet both the second output passages 32 of the second valve seat 3 and the middle pressure passages 33 simultaneously (hereinafter referred as a third communication condition).

4. A condition in which the communication between the second output passages 32 and the auxiliary middle pressure passages 34 of the second valve seat 3 and the communication between the second output port 64 and the auxiliary, and the auxiliary middle, pressure input port 66 are established because the arc shaped grooves 42 of the second valve element 4 meet both the second output passages 32 of the second valve seat 3 and the auxiliary middle pressure passages 34 simultaneously (hereinafter referred as a fourth communication condition).

The aforementioned communication conditions are repeated in order of the third communication condition, the fourth communication condition, the first communication condition, the fourth communication condition, the third communication condition, and the second communication condition as one cycle without overlapping one another. The second communication condition is shown in FIGS. 7 and 8.

The operation of the pulse tube refrigerator 602 having the rotary valve unit 202 will be explained as follows. In this case, the pressure of the outlet port 111I of the compressor unit 100 is determined to be a high pressure PH, the pressure of the inlet port 112 of the compressor unit 100 is determined to be a low pressure PL, the pressure of the reservoir 401 is determined to be a first middle pressure PM1, and the pressure in the auxiliary reservoir 402 is determined to be a second middle pressure PM2. The high pressure PH is higher than the second middle pressure PM2, the second middle pressure PM2 is higher than the first middle pressure PM1 and the first middle pressure PM1 is higher than the low pressure PL (PH>PM2>PM1>PL). The second middle pressure PM2 is higher than the middle pressure PM and the first middle pressure PM1 is lower than the middle pressure PM in the first embodiment (i.e., PM2>PM>PM1).

First, in the third communication condition of the rotary valve unit 202, the gas in the reservoir 401 is supplied to pulse tube port 312 side of the pulse tube 302 to increase the pressure of the pulse tube 302 and the regenerator 301 from the low pressure PL corresponding to the pressure of the inlet pert 112 of the compressor unit 100 to the first middle pressure PM1 corresponding to the pressure of the reservoir 401.

Second, when the first valve element 2 and the second valve element 4 are rotated by a predetermined angle from the abovementioned condition relative to the first valve seat 1 and the second valve seat 2 and the condition of the rotary valve unit 202 is switched from the third communication condition to the fourth communication condition, the gas of the auxiliary reservoir 402 is supplied to the pulse tube port 312 side of the pulse tube 302 to increase the pressure of the pulse tube 302 and the regenerator 301 from the first middle pressure PM1 corresponding to the pressure of the reservoir 401 to the second middle pressure PM2 corresponding to the pressure of the auxiliary reservoir 402.

Third, when the first valve element 2 and the second valve element 4 are rotated by a predetermined angle from the above-mentioned condition relative to the first valve seat 1 and the second valve seat 3, and the condition of the rotary valve unit 202 is switched from the fourth communication condition to the first communication condition, the high pressure gas which is compressed and radiated in the compressor unit 100 is cooled down in the regenerator 301 and supplied to a space of the cold head 303 side of the pulse tube 302 to increase the pressure of the regenerator 301 and the pulse tube 302 from the second middle pressure PM2 to the high pressure PH corresponding to the pressure of the outlet port 111 of the compressor unit 100.

Fourth, when the first valve element 2 and the second valve element 4 are rotated by a predetermined angle from the above mentioned condition relative to the first valve seat 1 and the second valve seat 3, and the condition of the rotary valve unit 202 is switched from the first communication condition to the fourth communication condition, the gas in the pulse tube port 312 side of the pulse tube 302 is returned to the auxiliary reservoir 402 to decrease the pressure of the regenerator 301 and the pulse tube 302 from the high pressure PH corresponding to the pressure of the outlet port 111 of the compressor unit 100 to the second middle pressure PM2 corresponding to the auxiliary reservoir 402. In this case, the gas temperature of the cold head 303 side of the pulse tube 302 becomes lower than the temperature of the cold head 303 by adiabatic expansion.

Fifth, when the first valve element 2 and the second valve element 4 are rotated by a predetermined angle from the above mentioned condition relative to the first valve seat 1 and the second valve seat 3 and the condition where the rotary valve unit 202 is switched from the fourth communication condition to the third communication condition, the gas in the pulse tube port 312 side of the pulse tube 302 is returned to the reservoir 401 to decrease the pressure of the regenerator 301 and the pulse tube 302 from the second middle pressure PM2 corresponding to the auxiliary reservoir 402 to the first middle pressure PM1 corresponding to the reservoir 401. In this case, the gas temperature of the cold head 303 side of the pulse tube 302 becomes further lowered by adiabatic expansion.

Finally, when the first valve element 2 and the second valve element 4 are rotated by a predetermined angle from the foregoing condition relative to the first valve seat 1 and the second valve seat 3, and the condition of the rotary valve unit 202 is switched from the third communication condition to the second communication condition, the gas is returned to the compressor unit 100 to decrease the pressure of the regenerator 301 and the pulse tube 302 from the middle pressure PM corresponding to the pressure of the reservoir 401 to the low pressure PL corresponding to the inlet port 112 of the compressor unit 100. In this case, the gas temperature of the cold head 303 side of the pulse tube 302 is further lowered by adiabatic expansion. The gas with lowered temperature is returned to the compressor unit 100 while cooling down the cold head 303 and the regenerator 301.

The foregoing cycle is defined as one cycle. By repeating the cycle with a frequency of one to several Hz, a cryogenic temperature is generated at the cold head 303. According to the second embodiment, since each passage of each valve seat and each groove of each valve element are formed with double rotational symmetry having the shaft 75 as an axis, the aforementioned cycle is repeated twice while the shaft 75 rotates once, that is, while each valve element rotates once relative to each valve seat. Each passage of each valve seat and each groove of each valve element may instead be formed with triple rotational symmetry. In this case, the aforementioned cycle is repeated three times while each valve element rotates once relative to each valve seat. Generally, each passage of each valve seat and each groove of each valve element may be formed with N times rotational symmetry. In this case, the aforementioned cycle is repeated N times while each valve element rotates once relative to each valve seat.

According to the pulse tube refrigerator 602 having the rotary valve unit 202 of the first embodiment, since a sliding valve is used, the rotary valve unit 202 operates silently without generating noise like the solenoid valve. Since polytetrafluoroethylene which is the material forming the first valve seat 1 and the second valve seat 3 has a small frictional coefficient and high durability relative to the heat treated stainless steel used as the material of the first valve element 2 and the second valve element 4, the first vale seat 1 and the second valve seat 3 are hardly worn after the long term operation with frequency of one to several Hz of rotation of motor 7. Thus, the problem of durability is not raised.

According to the second embodiment, like the first embodiment, the second center hole 43 is formed on the fourth sliding plane 40 side as a recessed sf ace in the sliding surfaces between the third sliding plane 30 and the fourth sliding plane 40. Since the second center hole 43 is in communication with the low pressure input port 62 via a communication passage (i.e., corresponding to the third low pressure passage 46, the second low pressure passage 26, the first center hole 13 and the first low pressure passage 58), leakage between the sliding surfaces of the third sliding plane 30 and the fourth sliding plane 40 can be introduced to the low pressure input port 62 with low pressure. Accordingly, leakage from the high pressure input port 61 side of the high pressure to the second output port 64 side (i.e., pulse tube 302 side) of the middle pressure and the leaked amount from the second output port 64 (i.e., pulse tube 302 side) side of the middle pressure to the low pressure input port 62 side having low pressure can be balanced to prevent the flow of leaked gas from the second output port 64 to the pulse tube 302 side. Accordingly, the generation of unidirectional flow of the leaked gas in the pulse tube refrigerator 602 can be prevented, to contribute to the improvement of the refrigeration efficiency of the pulse tube refrigerator 602.

The rotary valve unit 202, the reservoir 401 and the auxiliary reservoir 402 may be fixed to a common member to form a unit and may be structured as a rotary valve unit 502 with the reservoir 401 and the auxiliary reservoir 402 in the pulse tube refrigerator 602. Thus, the pulse tube refrigerator 602 can be formed with three units including the compressor unit 100, the rotary valve unit 502 with the reservoir 401 and the auxiliary reservoir 402, and a cooling unit 300 including the regenerator 301, the pulse tube 302 and the cold head 303. A self sealing joint having a built-in check valve on an end, which is automatically opened when connected and automatically closed when separated, may be applied at a joint of the output port 111 and the high pressure line 121, at the joint of the high pressure line 121 and the high pressure input port 61, the joint of the inlet port 112 and the low pressure line 122, at the joint of the low pressure line 122 and the low pressure input port 62, at the joint of the first output port 63 and the regenerator line 321, at the regenerator line 321 and the regenerator port 311, at the second output port 64 and the pulse tube line 322, and at the joint of the pulse tube line 322 and the pulse tube port 312 in the pulse tube refrigerator 602. A flexible tube may be applied to the high pressure line 121, the low pressure line 122, the regenerator line 321, and the pulse tube line 322. Accordingly, installation and maintenance become easy.

Third Embodiment

Figure 9:
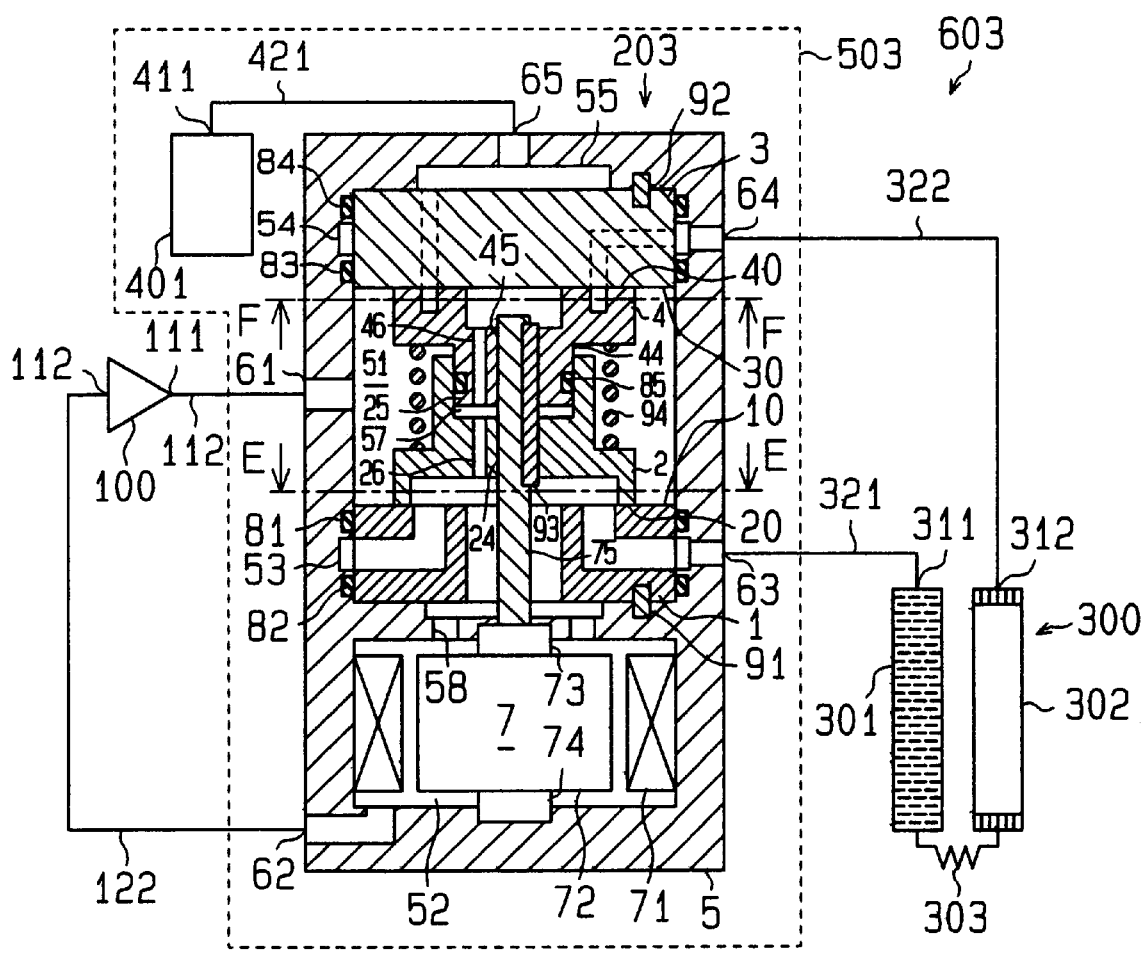
FIG. 9 is a cross-sectional view of a rotary valve unit and an overview of a pulse tube refrigerator applied with the rotary valve unit according to a third embodiment of the present invention.

FIG. 9 shows a cross-sectional view of a rotary valve unit 203 and an overview of a pulse tube refrigerator 603 applied with the rotary valve unit 203 according to a third embodiment of the present invention. The rotary valve unit 203 has a pressure switching mechanism using a sliding valve instead of the first solenoid valve 701, the second solenoid valve 702, the third solenoid valve 703, the fifth solenoid valve 745, and the sixth solenoid valve 706 of the known pulse tube refrigerator 613.

As shown in FIG. 9, the rotary valve unit 203 includes a housing 5, a motor 7 disposed in the housing 5, a first valve seat 1, a first valve element 2, a second valve seat 3 and a second valve element 4.

Figure 10:
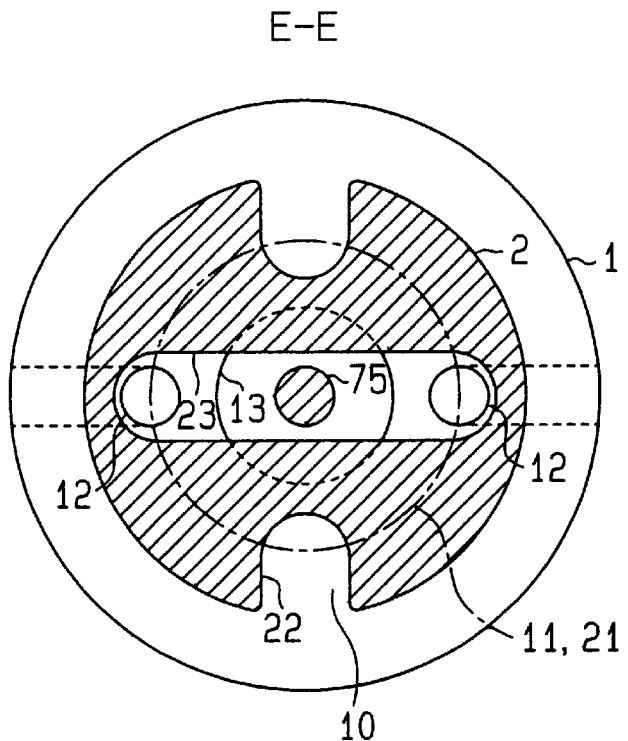
FIG. 10 is a cross-sectional view for showing a communication between a first valve seat and a first valve element taken on line 10—10.
Figure 11:
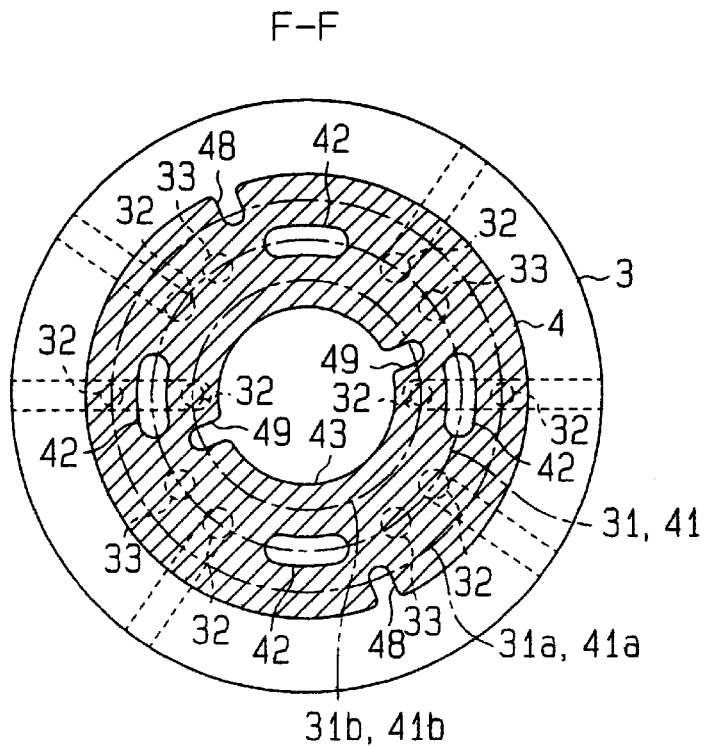
FIG. 11 is a cross-sectional view showing a communication between a second valve seat and a second valve element taken on line 11—11.

Referring to FIGS. 9–11, the housing s includes a high pressure input port 61, a low pressure input port 62, a first output port 63, a second output port 64 and a middle pressure input port 65. An outlet port 111 of a compressor unit 100 is in communication with the high pressure input port 61 via a high pressure line 121. An inlet port 112 of the compressor unit 104 is in communication with the low pressure input port 62 via a low pressure line 122. A regenerator port 311 of a regenerator 301 is in communication with the first output port 63 via a regenerator line 321. A pulse tube port 312 of a pulse tube 302 is in communication with the second output port 64 via a pulse tube line 322, and a reservoir port 411 of a reservoir 401 is in communication with a middle pressure input port 65 via a reservoir line 421.

The motor 7 actuated by an external power source (not shown) includes a stator 71 fixed in the housing S, a rotor 72 rotatably supported by a bearing 73 and a bearing 74 in the housing 5, and a shaft 75 for transmitting the rotational force of the rotor 72. A first low pressure space 52 in which the motor 7 is positioned is in communication with the low pressure input port 62.

The first valve seat 1 made of a material with low frictional coefficient such as polytetrafluoroethylene is formed in a cylindrical shape. The first valve seat 1 includes a first sliding plane 10 on one end. The first sliding plane 10 is positioned to face upward in FIG. 1 and is fixed to the housing 5 perpendicular to the shaft 75 by a pin 91. As shown in FIG. 10, two first output passages 12 are formed with rotational symmetry on a first pitch circle 11 concentric with the axis of the shaft 75 an the first sliding plane 10. A first center hole 13 is formed in the center of the first sliding plane 10. The first output passages 12 have openings on the cylindrical surface of the first valve seat 1 to be in a communication with the first output port 63 via a first annular output space 53 formed around the cylindrical surface of the valve seat 1. The first center hole 13 is in communication with the low pressure input port 62 via a first low pressure passage 58 and the first low pressure space 52. The shaft 75 penetrates the first center hole 13 without contact.

The first valve element 2, made of hard material such as heat treated stainless steel, has a stepped cylindrical shape. The first valve element 2 includes a second sliding plane 20 on an end which has a larger diameter. The second sliding plane 20 is positioned opposing the first sliding plane 10 of the first valve seat 1 for contacting thereto. The shaft 75 is fitted into a first fitting hole 24 formed on the first valve element 2 to be fixed with key 93. As shown in FIG. 10, two high pressure grooves 22 recessed from the cylindrical surface with a predetermined depth cross over a second pitch circle 21 concentric with the axis of the shaft 75 and having the same diameter with the first pitch circle 11 of the first valve seat 1 are formed with rotational symmetry relative to each other on the first valve element 2. A low pressure groove 23 crosses the center of the first valve element 2, crosses the second pitch circle 21, and is formed at a right angle relative to the high pressure grooves 22 on the first valve element 2. The high pressure grooves 22 have openings to a high pressure space 51 in communication with the high pressure input port 61. The low pressure groove 23 has an opening to the first center hole 13 of the first valve seat 1 in communication with the low pressure input port 62 via the first low pressure passage 58 and the first low pressure space 52. A second fitting hole 25 with a predetermined depth is formed in the center of an end having a smaller diameter opposite to the sliding surface 20 on the first valve element 2. The second fitting hole 25 is in communication with the first center hole 13 via the second low pressure passage 26 formed in the first valve element 2.

The second valve seat 3, like the first valve seat 1, made of a material with low frictional coefficient such as polytetrafluoroethylene, is formed in cylindrical shape. The second valve seat 3 includes a third sliding plane 30 on one end. The third sliding plane 30 is positioned opposing the first valve seat, while keeping a predetermined distance from the first sliding plane 10 of the first valve seat 1, and is fixed to the housing 5 perpendicular to the shaft 75 by a pin 92. As shown in FIG. 11, four second output passages 32 are formed with rotational symmetry on a third pitch circle 31 sharing a common center with axis of the shaft 75 on the third sliding plane 30. Four middle pressure passages 33 are formed on the third pitch circle 31, with a predetermined central angle relative to the second output passages 32, respectively. Another pair of second output passages 32 are formed with rotational symmetry on a fifth pitch circle 31*a* which is concentric with the third pitch circle 31 and has a larger diameter than the third pitch circle 31. Further, a pair of second output passages 32 are formed with rotational symmetry on a sixth pitch circle 31*b* which is concentric with the third pitch circle 31 and has smaller diameter than the third pitch circle 31. The openings of the second output passages 32 formed on the fifth pitch circle 31*a* and the openings of the second output passages 32 formed on the sixth pitch circle 31*b* are formed on the same diameter, that is, on a common straight line running through the center of each pitch circle. The second output passages 32 have openings to the cylindrical surface, to be in communication with the second output port 64 via a second annular output space 54 formed around the cylindrical surface. The middle pressure passages 33 have openings penetrating to the opposite side of the second valve seat 3, to be in communication with the middle pressure input port 65 via a middle pressure space 55.

The second valve element 4, like the first valve element 2 made of hard material such as heat treated stainless steel, is formed in a stepped cylindrical shape. The second valve element 4 includes a fourth sliding plane 40 on one end having a larger diameter. The fourth sliding plane 40 is positioned opposing the third sliding plane 30 of the second valve seat 3 for contact therewith. A fitting shaft 44 provided on the other end of the second valve element 4 having a smaller diameter is fitted to the second fitting hole 25 of the first valve element 2 to form a second low pressure space 57. The shaft 75 is fitted into a third fitting hole 45 formed on the second valve element 4 to be fixed with a key 93. As shown in FIG. 11, four arc shaped grooves 42 recessed with a predetermined depth with angles equal to the central angle subtended at the center by a cord of the second output passages 32 and the middle pressure passages 33 are formed on the third sliding plane 30 of the second valve seat 3 and have rotational symmetry on a fourth pitch circle 41 having the same diameter as the third pitch circle 31 of the second valve seat 3 concentric with the axis of the shaft 75. A second center hole 43 having a predetermined depth is formed in the center of the fourth sliding plane 40 of the second valve element 4. Two symmetric auxiliary high pressure grooves 48 which are recessed with a predetermined depth from the cylindrical surface of the second valve element 4 cross a seventh pitch circle 41*a* concentric with the axis of the shaft 75 and have the same diameter as the fifth pitch circle 31 of the second valve seat 3. Two auxiliary low pressure grooves 49 which are notched by a predetermined depth from the second center hole 43 cross over an eighth pitch circle 41*b* concentric with the axis of the shaft 75, have the same diameter as the sixth pitch circle 31*b* of the second valve seat 3, and extend at 90 degrees relative to the auxiliary high pressure grooves 48. The second center hole 43 is in communication with the second low pressure space 57 via a third low pressure passage 46 formed in the second valve element 4. The second low pressure space 57 is in communication with the first center hole 13 of the first valve seat 1 via the second low pressure passage 26 formed on the first valve element 2. Accordingly, like the first center hole 13, the second center hole 43 is in communication with the low pressure input port 62. The auxiliary high pressure grooves 48 having openings to the high pressure space 51 are in communication with the high pressure input port 61. The auxiliary low pressure grooves 49 having openings to the second center hole 43 are in communication with the low pressure input port 62.

The first output space 53 and the high pressure space 51 are gas-tightly separated by an O-ring 81. The first output space 53 and the first low pressure space 52 are gas-tightly separated by an O-ring 82. The second output space 54 and the high pressure space 51 are gas-tightly separated by an O-ring 83. The second output space 54 and the middle pressure space 55 are gas-tightly separated by an O-ring 84. And the second low pressure space 57 and the high pressure space 51 are gas-tightly separated by an O-ring 85.

The first valve element 2 and the second valve element 4 are pushed to the first valve seat 1 and the second valve seat 3 respectively by the pressure of the high pressure gas of the high pressure space 51 and the biasing force of a coil spring 94 provided therebetween. Accordingly, the first sliding plane 10 of the first valve seat 1 and the second sliding plane 20 of the first valve element 2 tightly contact each other, and the third sliding plane 30 of the second valve seat 3 and the fourth sliding plane 40 of the second valve element 4 tightly contact each other.

The rotary valve unit 203 is actuated by the motor 7. The first valve element 2 and the second valve element 4 are sychronously rotated by the rotation of the rotor 72 and the shaft 75. Accordingly, the first valve element 2 slidably rotates relative to the first valve seat 1 and the second valve element 4 slidably rotates relative to the second valve seat 3. A first rotary valve 1A is formed by the first valve seat 1 and the first valve element 2. By slidably rotating the first valve element 2 relative to the first valve seat 1, switching for establishing and interrupting the communication between the high pressure input port 61 and the first output port 63, and the switching for establishing and interrupting the communication between the low pressure input port 69 and the first output port 63 are 10S. performed. A second rotary valve 1B is formed by the second valve seat 3 and the second valve element 4. By slidably rotating the second valve element 4 relative to the second valve seat 3, switching for establishing and interrupting the communication between the middle pressure input port 65 and the second output port 64, switching for establishing and interrupting the communication between the high pressure input port 61 and the second output port 64, and the switching for establishing and interrupting the communication between the low pressure input port 62 and the second output port 64, are performed. The motor 7 can be rotated in clockwise direction viewed from the top of the shaft 75.

In the third embodiment, five communication patterns between each port of the rotary valve unit 203 are achieved as follows:

1. A condition in which the communication between the high pressure input port 61 and the first output port 63 is established because the high pressure grooves 22 of the first valve element 2 meet the first output passages 12 of the first valve seat 1 (hereinafter referred as a first communication condition).

2. A condition in which the communication between the high pressure input port 61 and the first output port 63 is established because the high pressure grooves 22 of the first valve element 2 meet the first output passages 12 of the first valve seat 1 and the communication. between the high pressure input port 61 and the second output port 64 is established because the auxiliary high pressure grooves 48 meets the second output passages 32 having openings on the fifth pitch circle 31a of the second valve seat 3 (hereinafter referred as a fifth communication condition).

3. A condition in which the communication between the low pressure input port 62 and the first output port 63 is established because the low pressure groove 23 of the first valve element 2 meets the first output passage 12 (hereinafter referred as a second communication condition).

4. A condition in which the communication between the low pressure input port 62 and the first output port 63 is established because the low pressure grooves 23 of the first valve element 2 meet the first output passages 12 of the first valve seat 1 and the communication between the low pressure input port 62 and the second output port 64 is established because the auxiliary low pressure grooves 49 of the second valve element 4 meets the second. output passages 32 having openings on the sixth pitch circle 31b of the second valve seat 3 (hereinafter referred as a sixth communication condition).

5. A condition in which the communication between the second output passages 32 and the middle pressure passages 33 and the communication between the second output port 64 and the middle pressure input port 65 are established because the arc shaped grooves 42 of the second valve element 4 meet both the second output passages 32 of the second valve seat 3 and the middle pressure passages 33 simultaneously (hereinafter referred as a third communication condition).

Figure 12:
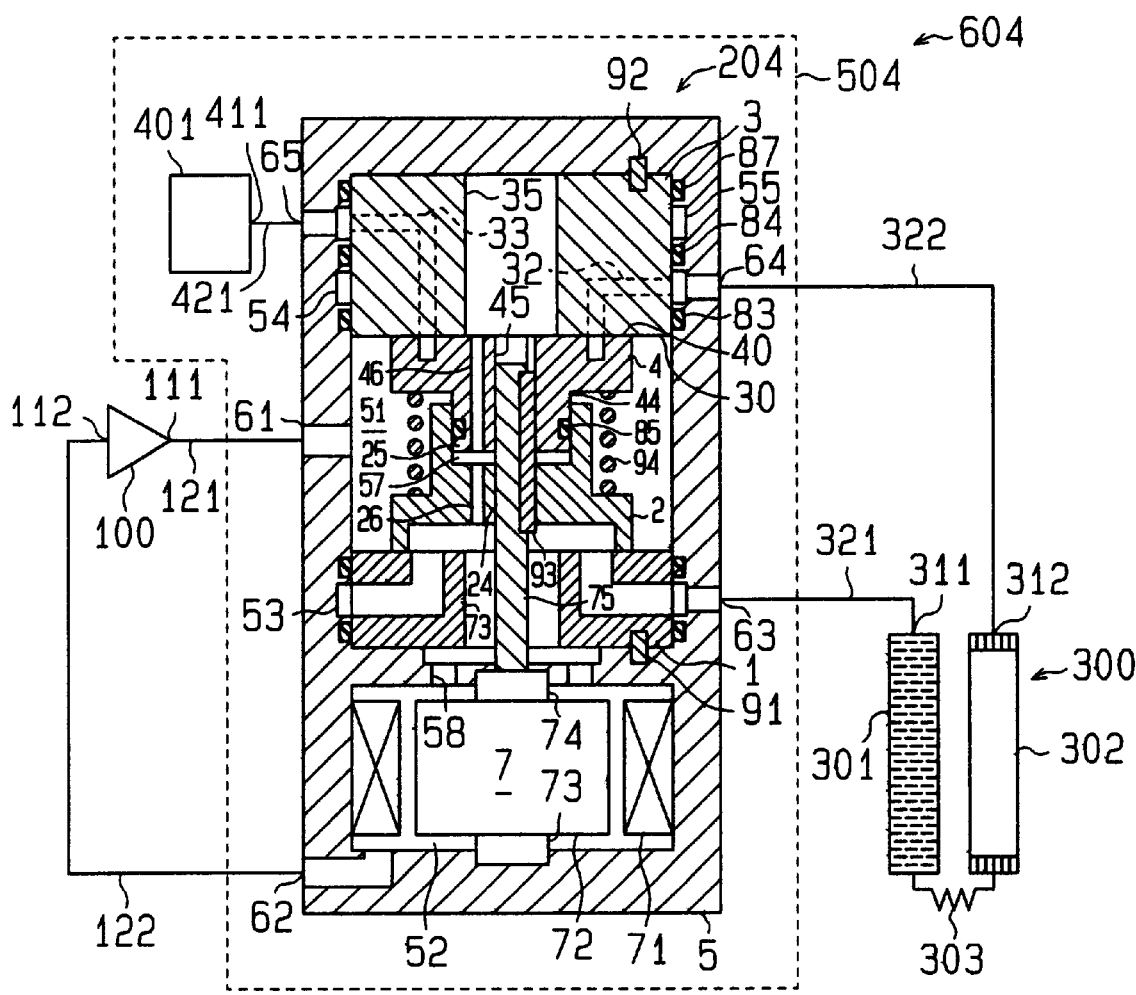
FIG. 12 is a cross-sectional view of a rotary valve unit and an overview of a pulse tube refrigerator applied with the rotary valve unit according to a fourth embodiment of the present invention.
Figure 13:
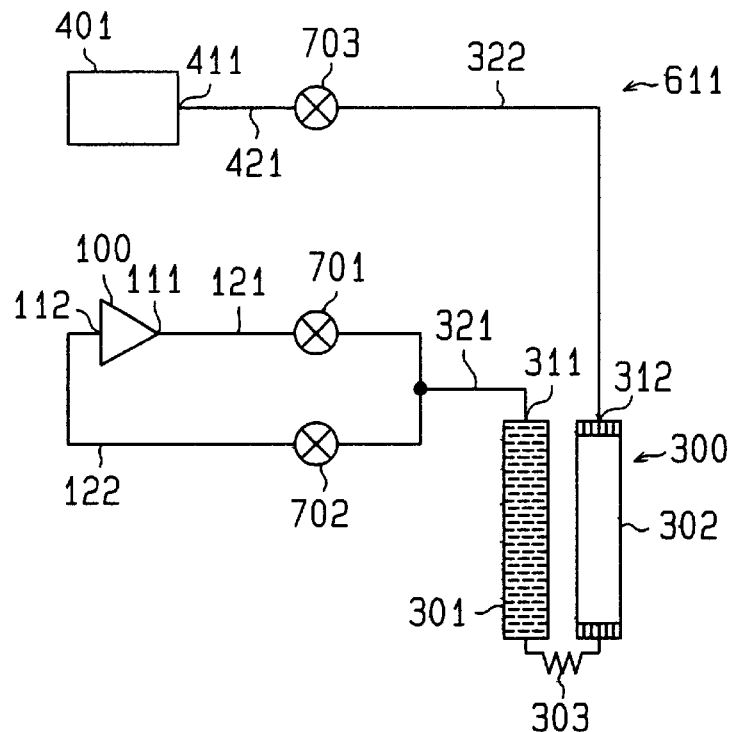
FIG. 13 is an overview of a known pulse tube refrigerator.
Figure 14:
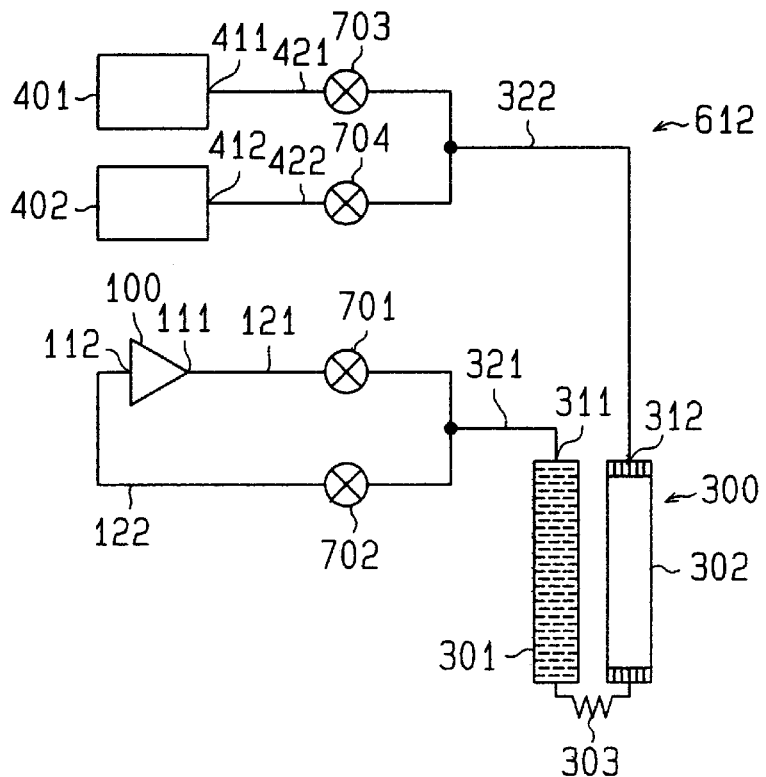
FIG. 14 is an overview of another known pulse tube refrigerator.
Figure 15:
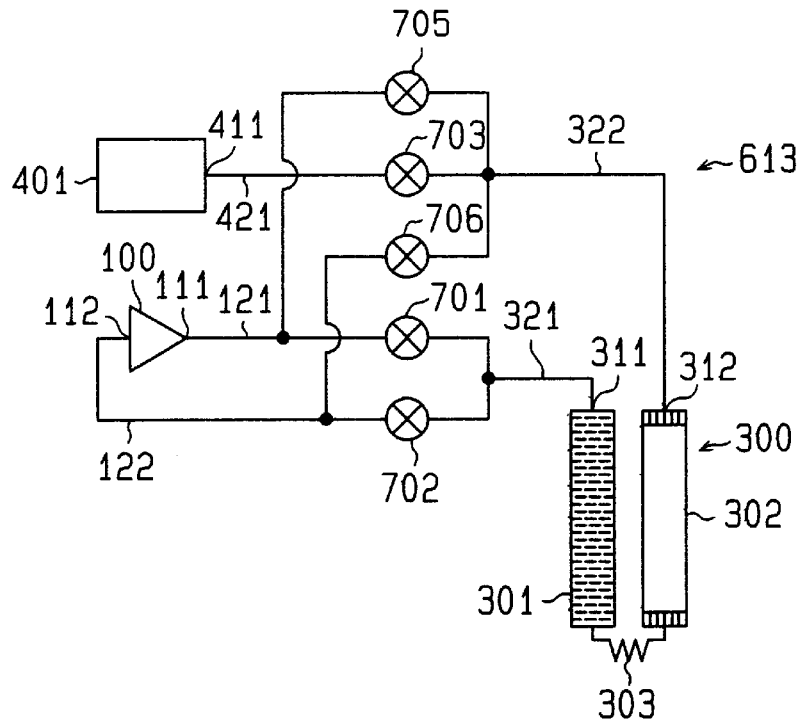
FIG. 15 is an overview of a further known pulse tube refrigerator.
Figure 16:
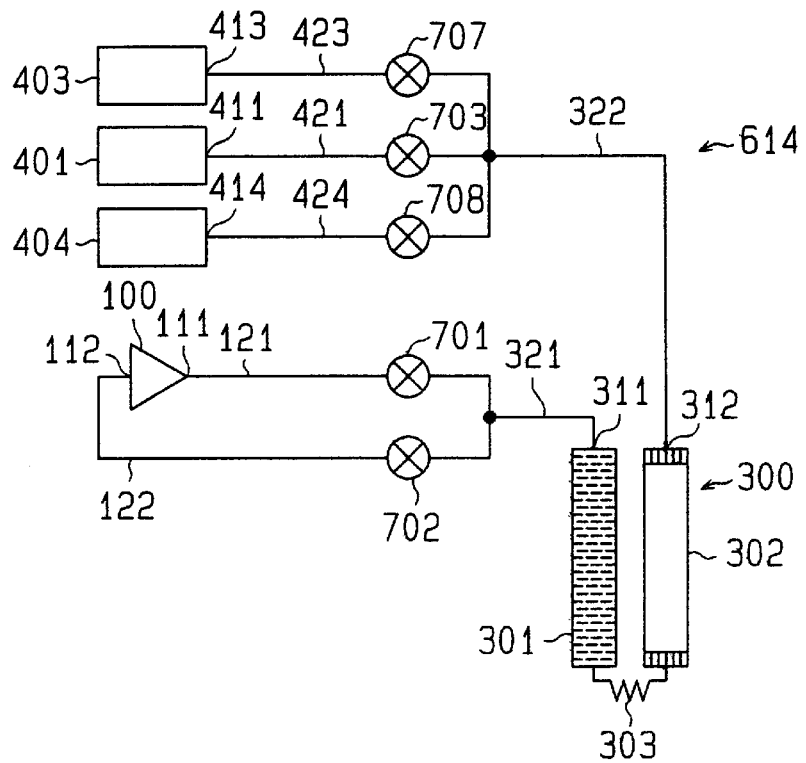
FIG. 16 is an overview of a still further known pulse tube refrigerator.
Figure 17:
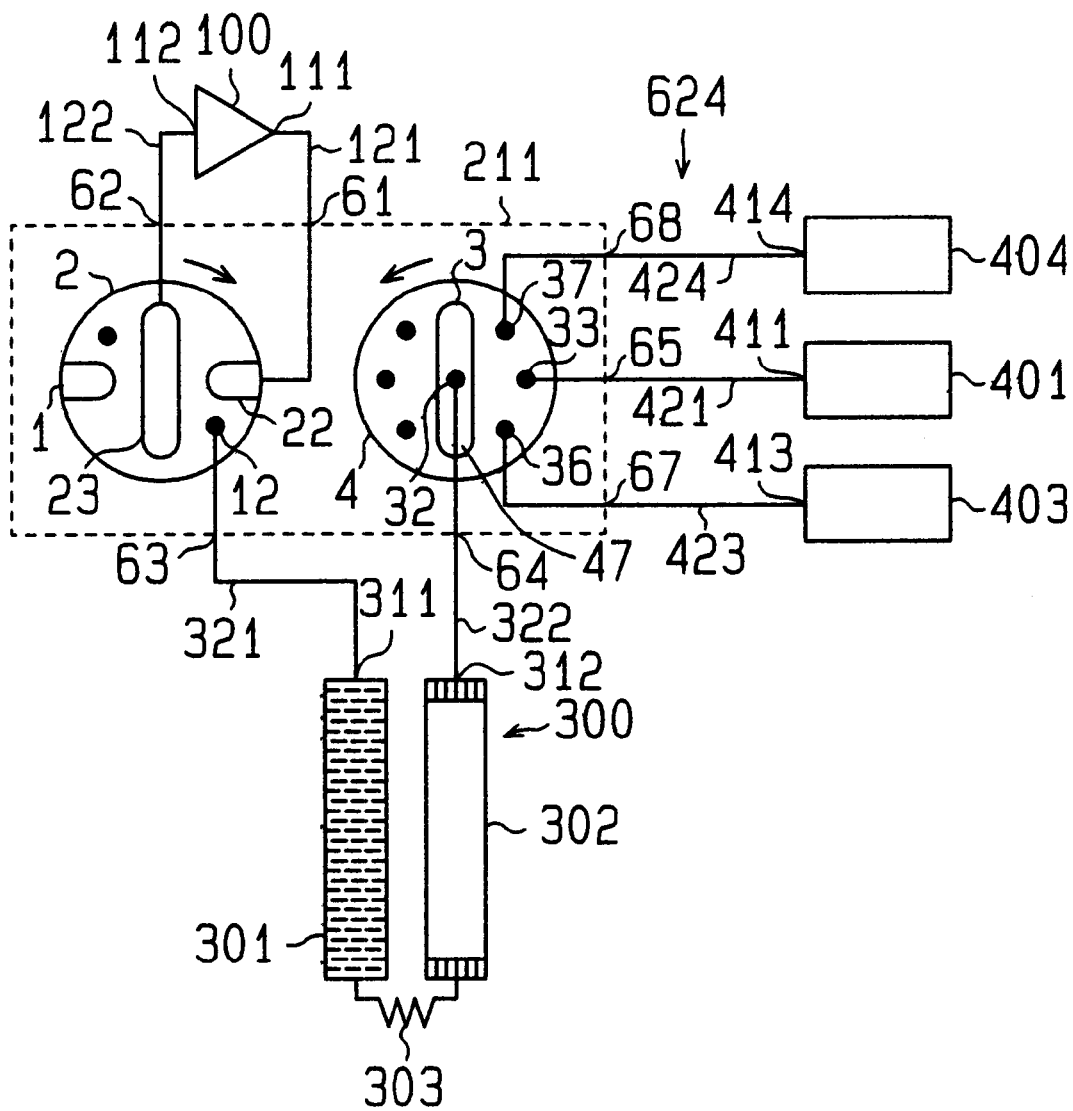
Figure 18:
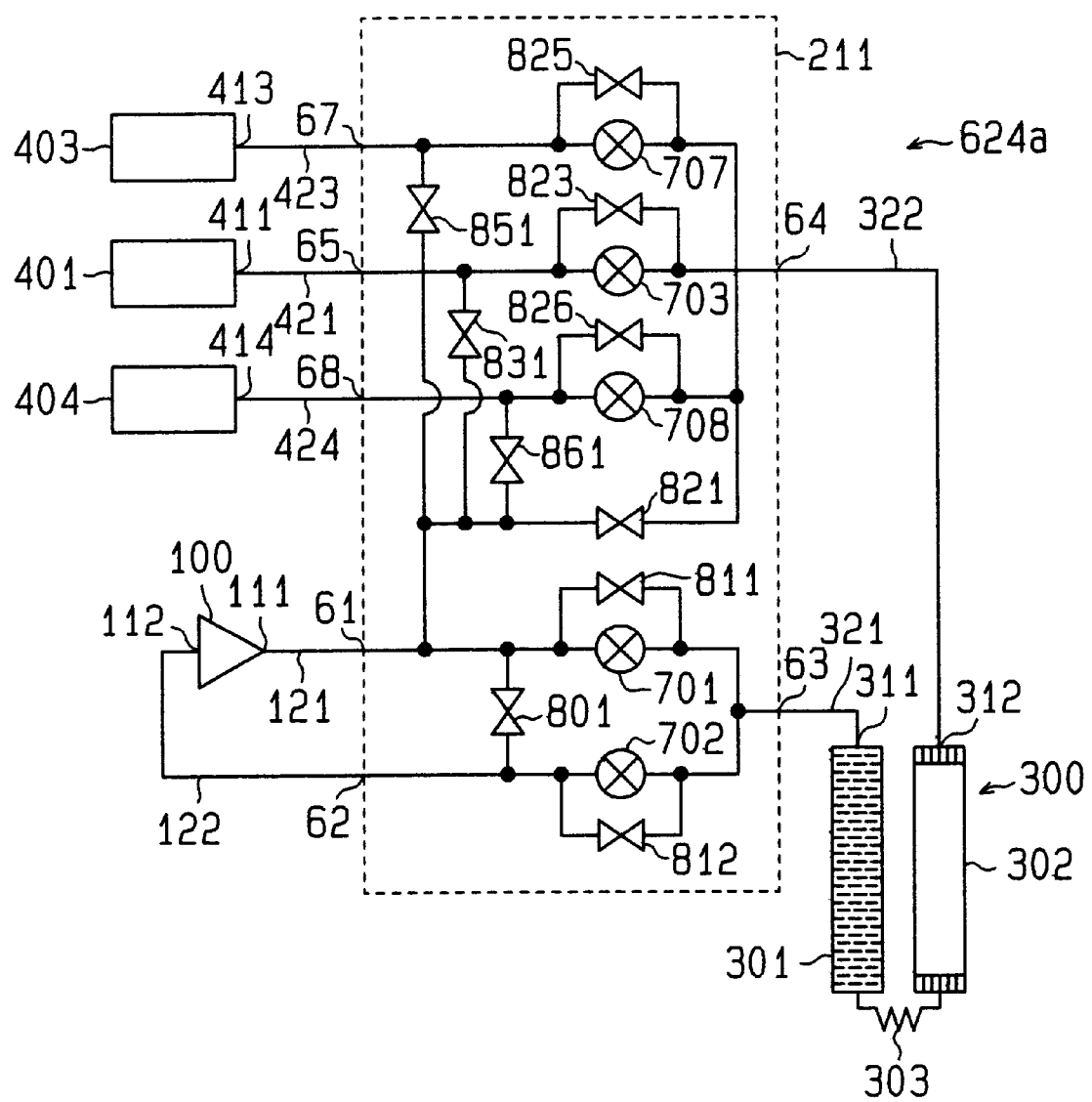
FIG. 18 is a view schematically showing the leakage along sliding surfaces of the rotary valve unit of the pulse tube refrigerator according to the known pulse tube refrigerator.

The aforementioned communication conditions are repeated in order of the third communication condition, the fifth communication condition, the first communication condition, the third communication condition, the sixth communication condition and the second communication condition as one cycle without overlapping one another. The second communication condition is shown in FIG. 12.

An actual operation of the pulse tube refrigerator 603 having the rotary valve unit 203 of the third embodiment will be explained as follows. In this case, the pressure of the outlet port 111 of the compressor unit 100 is determined to be a high pressure PH, the pressure of the inlet port 112 of the compressor unit 100 is determined to be a low pressure PL, and the pressure in the reservoir 401 is determined to be a middle pressure PM. The high pressure PH is determined to be higher than the middle pressure and the middle pressure is determined to be higher than the low pressure (i.e., PH>PM>PL).

First, in the third communication condition of the rotary valve unit 203, the gas in the reservoir 401 is supplied to the pulse tube port 312 side of the pulse tube 302 to increase the pressure of the pulse tube 302 and the regenerator 301 from the low pressure PL corresponding to the pressure of the inlet port 112 of the compressor unit 100 to the middle pressure PM corresponding to the pressure of the reservoir 401.

Second, when the first valve element 2 and the second valve element 4 are rotated by a predetermined angle from the aforementioned third communication condition relative to the first valve seat 1 and the second valve seat 2 and the rotary valve unit 203 assumes the fifth communication condition, the high pressure gas which is compressed and radiated in the compressor unit 100 is cooled down in the regenerator 301 and supplied to the cold head 303 side of the pulse tube 202 and is supplied to the pulse tube port 312 side of the pulse tube 302 to increase the pressure of the regenerator 301 and the pulse tube 302 from the middle pressure PM corresponding to the pressure in the reservoir 401 to the high pressure PH corresponding to the outlet port 111 of the compressor unit 100. In this case, the rotary valve unit 203 is switched to the first communication condition during this process.

Third, when the first valve element 2 and the second valve element 4 are rotated by a predetermined angle from the foregoing condition relative to the first valve seat 1 and the second valve seat 3 and the rotary valve unit 203 assumes the third condition again, the gas in the pulse tube port 312 side of the pulse tube 302 is returned to the reservoir 401 to decrease the pressure of the pulse tube 302 and the regenerator 301 from the high pressure PH corresponding to the pressure of the outlet port 111 of the compressor unit 100 to the middle pressure PM corresponding to the pressure of the reservoir 401. In this case, the gas temperature of the cold head 303 side of the pulse tube 302 becomes lower than the temperature of the cold head 303 due to adiabatic expansion.

Finally, when the first valve element 2 and the second valve element 4 are rotated by a predetermined angle from the foregoing condition relative to the first valve seat 1 and the second valve seat 3 and the condition of the rotary valve unit 201 is switched from the third communication condition to the sixth communication condition, the gas is returned to the compressor unit 100 to decrease the pressure of the regenerator 301 and the pulse tube 302 from the middle pressure PM corresponding to the pressure of the reservoir 401 to the low pressure PL corresponding to the inlet port 112 of the compressor unit 100. In this case, the gas temperature of the cold head 303 side of the pulse tube 302 is further lowered by adiabatic expansion. The gas with lowered temperature is returned to the compressor unit 100 while cooling down the cold head 303 and the regenerator 301 and is returned from the pulse tube port 312 side of the pulse tube 302 to the compressor unit 100. In this case, the rotary valve unit 203 is switched to the second communication condition during this process.

The foregoing cycle is defined as one cycle. By repeating the cycle with a frequency of one to several Hz, a cryogenic temperature is generated at the cold head 303. According to the first embodiment, since each passage of each valve seat and each groove of each valve element are formed with double rotational symmetry having the shaft 75 as an axis, the aforementioned cycle is repeated twice while the shaft 75 rotates once, that is, while each valve element rotates once relative to each valve seat. Each passage of each valve seat and each groove of each valve element may instead be formed with triple rotational symmetry. In this case, the aforementioned cycle is repeated three times while each valve element rotates once relative to each valve seat. Generally, each passage of each valve seat and each groove of each valve element may be formed with N times rotational symmetry. In this case, the aforementioned cycle is repeated N times while each valve element rotates once relative to each valve seat.

According to the pulse tube refrigerator 603 having the rotary valve unit 203 of the third embodiment, since a sliding valve is used, like in the first embodiment, the rotary valve unit 203 operates silently without generating noise like the solenoid valve. Since the first valve seat 1 and the second valve seat 3 are made of polytetrafluoroethylene with a small frictional coefficient and high durability like the first embodiment, the problem of durability is not raised.

According to the third embodiment, like the first embodiment, the second center hole 43 is formed on the fourth sliding plane 40 side as a recessed space in the sliding surfaces between the third sliding plane 30 and the fourth sliding plane 40. Since the second center hole 43 is in communication with the low pressure input port 62 via a communication passage (i.e., corresponding to the third low pressure passage 46, the second low pressure passage 26, the first center hole 13, and the first low pressure passage 58), leakage between the sliding surfaces of the third sliding plane 30 and the fourth sliding plane 40 can be introduced to the low pressure input port 62 which is at low pressure. Accordingly, leakage from the high pressure input port 61 side of the high pressure to the second output port 64 side (i.e., pulse tube 302 side) of the middle pressure and leakage from the second output port 64 (i.e., pulse tube 302 side) side at middle pressure to the low pressure input port 62 side at low pressure can be balanced to prevent the flow of the leaked gas from the second output port 64 to the pulse tube 302 side. Accordingly, the generation of unidirectional flow of the leaked gas in the pulse tube refrigerator 603 can be prevented, to contribute to the improvement of the refrigeration efficiency of the pulse tube refrigerator 603.

The rotary valve unit 203 and the reservoir 401 may be fixed to a common member to form a unit and may be formed as a rotary valve unit 503 with a reservoir in the pulse tube refrigerator 603. Thus, the pulse tube refrigerator 603 can be made with three units including the compressor unit 100, the rotary valve unit 503 with the reservoir 401, and a cooling unit 300 including the regenerator 301, the pulse tube 302 and the cold head 303. A self sealing joint having a built-in check valve on an end, which is automatically opened when connected and automatically closed when separated, may be applied at a joint of the output port 111 and the high pressure line 121, at the joint of the high pressure line 121 and the high pressure input port 61, the joint of the inlet port 112 and the low pressure line 122, at the joint of the low pressure line 122 and the low pressure input port 62, at the joint of the first output port 63 and the regenerator line 321, at the regenerator line 321 and the regenerator port 311, at the second output port 64 and the pulse tube line 322, and at the joint of the pulse tube line 322 and the pulse tube port 312 in the pulse tube refrigerator 603. A flexible tube may be applied to the high pressure line 121, the low pressure line 122, the regenerator line 321 and the pulse tube line 322. Accordingly, installation and maintenance become easy.

Fourth Embodiment

FIG. 12 shows a rotary valve unit 204 and a pulse tube refrigerator 604 applied therewith according to a fourth embodiment of the present invention.

The rotary valve unit 204 is formed with a third center hole 35 in the center of the third sliding plane 30 of the second valve seat 3 in place of the second center hole 43 formed on the fourth sliding-plane 40 of the second valve element 4 of the rotary valve unit 201 according to the first embodiment.

Likewise the rotary valve unit 201 of the first embodiment, the rotary valve unit 204 includes a housing 5, a motor 7 disposed in the housing 5, a first valve seat 1, a first valve element 2, a second valve seat 3 and a second valve element 4. The housing 5 includes a high pressure input port 61, a low pressure input port 62, a first output port 63, a second output port 64 and a middle pressure input port 65.

The motor 7, the first valve seat 1 and the first valve element 2 are disposed in the same manner as the rotary vale unit 201 of the first embodiment.

The second valve seat 3, formed in cylindrical shape like the rotary valve unit 201 of the first embodiment, includes a third sliding plane 30 on one end and is fixed to the housing 5. Like the rotary valve unit 201 of the first embodiment, second output passages 32 and middle pressure passages 33 are formed on the third sliding plane 30. A third center hole 35 is formed in the center of the third sliding plane 30. The second output passages 32 have openings to the cylindrical surface of the second valve seat 3 to be in communication with the second output port 64 via a second annular output space 54 formed around the cylindrical surface. The middle pressure passages have openings to the cylindrical surface to be in communication with an annular middle pressure space 55 formed around the cylindrical surface.

The second valve element 4, formed in a stepped cylindrical shape like the rotary valve unit 201 of the first embodiment, includes a fourth sliding plane 40 on a larger diameter end. The fourth sliding plane 40 contacts the third sliding plane 30 of the second valve seat 40 and the second valve element 4 is fixed to a shaft 75. Arc shaped grooves 42 and a third low pressure passage 46 are formed on the fourth sliding plane 40. The third low pressure passage 46 is in communication with a low pressure input port 62 via a second low pressure space 57, a second low pressure passage 26, a first center hole 13, a first low pressure passage 58 and a first low pressure space 52. Accordingly, the third center hole 35 formed on the third sliding plane 30 of the second valve seat 3 is in communication with the low pressure input port 62.

The first output space 53 and the high pressure space 51 are gas-tightly separated by an O-ring 81. The first output space 53 and the first low pressure space 52 are gas-tightly separated by an O-ring 82. The second output space 54 and the high pressure space 51 are gas-tightly separated by an O-ring 83. The second output space 54 and the middle pressure space 55 are gas-tightly separated by an O-ring 84. And the second low pressure space 57 and the high pressure space 51 are gas-tightly separated by an O-ring 85.

The first valve element 2 and the second valve element 4 are pushed to the first valve seat 1 and the second valve seat 3 respectively by the pressure of the high pressure gas of the high pressure space 51 and the biasing force of a coil spring 94 provided therebetween. Accordingly, the first sliding plane 10 of the first valve seat 1 and the second sliding plane 20 of the first valve element 2 tightly contact each other, and the third sliding plane 30 of the second valve seat 3 and the fourth sliding plane 40 of the second valve element 4 tightly contact each other.

The rotary valve unit 204 is actuated by the motor 7. The first valve element 2 and the second valve element 4 are synchronously rotated by the rotation of the rotor 72 and the shaft 75. Accordingly, the first valve element 2 slidably rotates relative to the first valve seat 1 and the second valve element 4 slidably rotates relative to the first valve seat 1, and the second valve element 4 slidably rotates relative to the second valve seat 3. A first rotary valve 1A is formed by the first valve seat 1 and the first valve element 2. By slidably rotating the first valve element 2 relative to the first valve seat 1, switching for establishing and interrupting the communication between the high pressure input port 61 and the first output port 63, and the switching for establishing and interrupting the communication between the low pressure input port 62 and the first output port 63, are performed. A second rotary valve 1B is formed by the second valve seat 3 and the second valve element 4. By slidably rotating the second valve element 4 relative to the second valve seat 3, switching for establishing and interrupting the communication between the middle pressure input port 65 and the second output post 64 is performed.

Since the operation of the rotary valve unit 204 is the same as the operation of the rotary valve unit 201, the explanation of the operation of the rotary valve unit 204 and the pulse tube refrigerator 614 applied therewith will be omitted.

According to the pulse tube refrigerator 604 having the rotary valve unit 204 of the fourth embodiment, since sliding valve is used like in the first embodiment, the rotary valve unit 204 operates silently without generating noise like the solenoid valve. Since the first valve seat 1 and the second valve seat 3 are made of polytetrafluoroethylene with a small frictional coefficient and high durability like the first embodiment, the problem of durability is not raised.

According to the fourth embodiment, the third center hole 35 is formed on the third sliding plane 30 side as a recessed space in the sliding surfaces between the third sliding plane 30 and the fourth sliding plane 40. Since the third center hole 35 is in communication with the low pressure input port 62 via a communication passage (i.e., corresponding to the third low pressure passage 46, the second low pressure passage 26, the first center hole 13 and the first low pressure passage 58), leakage between the sliding surfaces of the third sliding plane 30 and the fourth sliding plane 40 can be introduced to the low pressure input port 62 which is at low pressure. Accordingly, leakage from the high pressure input port 61 side of the high pressure to the second output port 64 side (i.e., pulse tube 302 side) of the middle pressure and the leakage from the second output port 64 (i.e., pulse tube 302 side) side at middle pressure to the low pressure input port 62 side at low pressure can be balanced to prevent the flow of leaked gas from the second output port 64 to the pulse tube 302 side. Accordingly, the generation of unidirectional flow of leaked gas in the pulse tube refrigerator 604 can be prevented, to contribute to the improvement of the refrigeration efficiency of the pulse tube refrigerator.

Like the rotary valve unit 204 of the fourth embodiment, the third center hole 35 may be formed in the center of the third sliding plane 30 on the rotary valve unit 202 of the second embodiment and the rotary valve unit 203 of the third embodiment in place of the second center hole 43 formed on the fourth sliding plane 40 of the second valve element 4. According to the embodiments of the present invention, a rotary valve unit and a pulse tube refrigerator applied therewith is quiet, and has high durability and improved refrigeration efficiency by restricting the generation of unidirectional flow.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made, and equivalents employed, without departing form the spirit of the present invention. Accordingly, it is expressly intended that all such variations, changes and equivalents which fall within the spirit and scope of the present invention as defined in the claims, be embraced thereby.

What is claimed is:

1. A rotary valve unit comprising:
   a housing comprising a high pressure input port connectable with an outlet port of a compressor unit,
   a low pressure input port connectable with an inlet port of the compressor unit;
   a first output port connectable with a regenerator;
   a second output port connectable with a pulse tube;
   a middle pressure input port connectable with a reservoir;
   a first rotary valve disposed in the housing, the first rotary valve comprising a first valve seat with a first sliding plane, a first valve element with a second sliding plane opposing and contacting the first sliding plane;
   a second rotary valve disposed in the housing, the second rotary valve comprising a second valve seat with a third sliding plane and a second valve element with a fourth sliding plane opposing and contacting the third sliding plane;
   a motor disposed in the housing, the motor comprising a shaft for synchronously rotating the first valve element and the second valve element; and
   a recessed space formed in at least one of sliding surfaces between the third sliding plane and the fourth sliding plane; and
   a communication passage communication between the recessed space and the low pressure input port, whereby communication between the high pressure input port and the first output port, and communication between the low pressure input port and the first output port is established and interrupted upon rotation of the second sliding plane relative to the first sliding plane during rotation of the first valve element relative to the first valve seat, and whereby communication between the second output port and the middle pressure input port is established and interrupted when the fourth sliding plane slidingly rotates relative to the third sliding plane upon rotation of the second valve element relative to the second valve seat.

2. A rotary valve unit according to claim 1, wherein the first valve seat further comprises a first output passage in communication with the first output port and a first center hole in communication with the low pressure input port, wherein the first valve body further comprises a high pressure groove in communication with the high pressure input port and a low pressure groove in communication with the low pressure input port, wherein the second valve seat further comprises a second output passage in communication with the second output port and a middle pressure passage in communication with the middle pressure input port, wherein the second valve element further comprises an arc shaped groove establishing communication between the second output passage and the middle pressure passage, and wherein the first valve element and the second valve element are rotated by a rotation of the shaft of the motor such that the communication between the high pressure input port and the first output port is established when the high pressure groove of the first valve element meets the first output passage of the first valve seat, the communication between the low pressure input port and the first output port is established when the low pressure groove of the first valve element meets the first output passage, and the communication between the middle pressure input port and the second output port is established when the arc shaped groove of the second valve element meets the second output passage and the middle pressure passage of the second valve seat simultaneously.

3. A rotary valve unit according to claim 2, wherein the housing further comprises a first low pressure passage, one end thereof being in communication with the low pressure input port and the other end thereof being in communication with the first center hole the first valve body; a second low pressure passage, one end thereof being in communication with the first center hole the second valve element; and a third low pressure passage, one end thereof being in communication with the second low pressure passage and the other end thereof being in communication with the recessed space, wherein the first low pressure passage, the second low pressure passage and the third low pressure passage form the communication passage.

4. A rotary valve unit according to claim 1, wherein the housing further comprises an auxiliary middle pressure input port in communication with an auxiliary reservoir, and movement of the second rotary valve is operative for establishing and interrupting a communication between the second output port and the middle pressure input port, and for establishing and interrupting a communication between the second output port and the auxiliary middle pressure input port.

5. A rotary valve unit according to claim 4, wherein the first valve seat further comprises a first output passage in communication with the first output port and a first center hole in communication with the low pressure input port, the first valve element further comprising a high pressure groove in communication with the high pressure input port and a low pressure groove in communication with the low pressure input port, the second valve seat further comprising a second output passage in communication with the second output port, a middle pressure passage in communication with the middle pressure input port and an auxiliary middle pressure passage in communication with the auxiliary middle pressure input port, the second valve element further comprising an arc shaped groove for establishing communication between the second output passage and the middle pressure passage and for establishing communication between the second output passage and the auxiliary middle pressure passage, and wherein the first valve element and the second valve element are configured to be rotated by the rotation of the shaft of the motor, whereby the communication between the high pressure input port and the first output port is established when the high pressure groove of the first valve element meets the first output passage of the first valve seat, the communication between the low pressure input port and the first output port is established when the low pressure groove of the first valve element meets the first output passage of the first valve seat, the communication between the middle pressure input port and the second output port is established when the arc shaped groove of the second valve element meets the second output passage and the middle pressure passage of the second valve seat simultaneously, and the communication between the auxiliary middle pressure input port and the second output port is established when the arc shaped groove meets the second output passage and the auxiliary middle pressure passage of the second valve seat simultaneously.

6. A rotary valve unit according to claim 5, wherein the housing further comprises a first low pressure passage, one end thereof being in communication with the low pressure input port and the other end thereof being in communication with the first center hole, the first valve body further comprises a second low pressure passage, one end thereof being in communication with the first center hole, the second valve element further comprises a third low pressure passage, one end thereof being in communication with the second low pressure passage and the other end thereof being in communication with the recessed space, and wherein the first low pressure passage, the second low pressure passage, and the third low pressure passage form the communication passage.

7. A rotary valve unit according to claim 1, wherein movement of the second rotary valve provides switching for establishing and interrupting a communication between the second output port and the middle pressure input port, switching for establishing and interrupting a communication between the second output port and the high pressure input port, and switching for establishing and interrupting a communication between the second output port and the low pressure input port.

8. A rotary valve unit according to claim 7, wherein the first valve seat further comprises a first output passage in communication with the first output port and a first center hole in communication with the low pressure input port, the first valve element further comprises a high pressure groove in communication with the high pressure input port and a low pressure groove in communication with the low pressure input port, the second valve seat further comprises a second output passage in communication with the second output port and a middle pressure passage in communication with the middle pressure input port, the second valve element further comprises an arc shaped groove for establishing communication between the second output passage and the middle pressure passage, further comprising an auxiliary high pressure groove in communication with the high pressure input port and an auxiliary low pressure groove in communication with the low pressure input port, wherein the first valve element and the second valve element are configured to be rotated by a rotation of the shaft of the motor the communication between the high pressure input port and the first output port is established when the high pressure groove of the first valve element meets the first output passage of the first valve seat, the communication between the low pressure input port and the first output port is established when the low pressure groove of the first valve element meets the first output passage of the first valve seat, the communication between the middle pressure input port and the second output port is established when the arc shaped groove of the second valve element meets the second output passage and the middle pressure passage of the second valve seat simultaneously, the communication between the high pressure input port and the second output port is established when the auxiliary high pressure groove of the second valve element meets the second output passage of the second valve seat, and the communication between the low pressure input port and the second output port is established when the auxiliary low pressure groove of the second valve element meets the second output passage of the second valve element.

9. A rotary valve unit according to claim 8, wherein the housing further comprises a first low pressure passage, one end thereof being in communication with the low pressure input port and the other end thereof being in communication with the first center hole; the first valve body further comprises a second low pressure passage, one end thereof being in communication with the first center hole; the second valve element further comprises a third low pressure passage, one end thereof being in communication with the second low pressure passage and the other end thereof being in communication with the recessed space, and wherein the first low pressure passage, the second low pressure passage, and the third low pressure passage form the communication passage.

10. A pulse tube refrigerator comprising:
a compressor unit;
a regenerator;
a pulse tube;
a reservoir; and
rotary valve unit comprising:
  a housing comprising a high pressure input port connected with an outlet port of the compressor unit;
  a low pressure input port connected with an inlet port of the compressor unit;
  a first output port connected with the regenerator;
  a second output port connected with the pulse tube;
  a middle pressure input port connected with the reservoir;
  a first rotary valve disposed in the housing, the first rotary valve comprising a first valve seat with a first sliding plane, a first valve element with a second sliding plane opposing and contacting the first sliding plane;
  a second rotary valve disposed in the housing, the second rotary valve comprising a second valve seat with a third sliding plane and a second valve element with a fourth sliding plane opposing and contacting the third sliding plane;
  a motor disposed in the housing, the motor comprising a shaft for synchronously rotating the first valve element and the second valve element; and
  a recessed space formed in at least one of sliding surfaces between the third sliding plane and the fourth sliding plane; and
  a communication passage communication between the recessed space and the low pressure input port, whereby communication between the high pressure input port and the first output port, and communication between the low pressure input port and the first output port is established and interrupted upon rotation of the second sliding plane relative to the first sliding plane during rotation of the first valve element relative to the first valve seat, and whereby communication between the second output port and the middle pressure input port is established and interrupted when the fourth sliding plane slidingly rotates relative to the third sliding plane upon rotation of the second valve element relative to the second valve seat.

11. A pulse tube refrigerator according to claim 10, wherein the rotary valve unit further comprises a first output passage in communication with the first output port and formed on the first valve seat, a first center hole in communication with the low pressure input port and formed on the first valve seat, a high pressure groove in communication with the high pressure input port and formed on the first valve element, a low pressure groove in communication with the low pressure input port and formed on the first valve element, a second output passage in communication with the second output port and formed on the second valve seat, a middle pressure passage in communication with the middle pressure input port and formed on the second valve seat, and an arc shaped groove formed on the second valve element for establishing communication between the second output passage and the middle pressure passage, and wherein the first valve element and the second valve element are configured to be rotated by a rotation of the shaft of the motor, the communication between the high pressure input port and the first output port is established when the high pressure groove of the first valve element meets the first output passage of the first valve seat, the communication between the low pressure input port and the first output port is established when the low pressure groove of the first valve element meets the first output passage of the first valve seat, and the communication between the middle pressure input port and the second output port is established when the arc shaped groove of the second valve element meets the second output passage and the middle pressure passage of the second valve seat simultaneously.

12. A pulse tube refrigerator according to claim 10, wherein the housing of the rotary valve unit further comprises an auxiliary middle pressure input port in communication with an auxiliary reservoir; and wherein the second rotary valve is configured to perform switching for establishing and interrupting communication between the second output port and the middle pressure input port and switching for establishing and interrupting a communication between the second output port and the auxiliary middle pressure input port.

13. A pulse tube refrigerator according to claim 12, wherein the rotary valve unit, the reservoir and the auxiliary reservoir comprise one unit.

14. A pulse tube refrigerator according to claim 12, further comprising a high pressure line for communication between the outlet port and the high pressure input port, a low pressure line for communication between the inlet port and the low pressure input port, a regenerator line for communication between a regenerator port of the regenerator and the first output port, a pulse tube line for communication between a pulse tube port of the pulse tube and the second output port, a self sealing joint having a built-in check valve on one end and adapted to automatically open when connected and automatically close when separated, wherein the self sealing joint is connected to a joint between the outlet port and the high pressure line, a joint between the high pressure line and the high pressure input port, a joint between the inlet port and the low pressure line, a joint between the low pressure line and the low pressure input port, a joint between the first output port and the regenerator line, a joint between the regenerator line and the regenerator port, a joint between the second output port and the pulse tube line, and a joint between the pulse tube line and the pulse tube port, wherein a flexible tube is used for the high pressure line, the low pressure line, the regenerator line and the pulse tube line.

15. A pulse tube refrigerator according to claim 12, wherein the rotary valve unit comprises a first output passage in communication with the first output port and formed on the first valve seat, a first center hole in communication with the low pressure input port and formed on the first valve seat, a high pressure groove in communication with the high pressure input port and formed on the first valve element; a low pressure groove in communication with the low pressure input port and formed on the first valve element, a second output passage in communication with the second output port and formed on the second valve seat, a middle pressure passage in communication with the middle pressure input port and formed on the second valve seat, an auxiliary middle pressure passage in communication with the auxiliary middle pressure input port and formed on the second valve seat and an arc shaped groove for establishing a communication between the second output passage and the middle pressure passage and for establishing a communication between the second output passage and the auxiliary output passage formed on the second valve element, and wherein the first valve element and the second valve element are configured to be rotated by rotation of the shaft of the motor, wherein the communication between the high pressure input port and the first output port is established when the high pressure groove of the first valve element meets the first output passage of the first valve seat, the communication between the low pressure input port and the first output port is established when the low pressure groove of the first valve element meets the first output passage of the first valve seat, the communication between the middle pressure input port and the second output port is established when the arc shaped groove of the second valve element meets the second output passage and the middle pressure passage of the second valve seat simultaneously, and the communication between the auxiliary middle pressure input port and the second output port is established when the arc shaped groove meets the second output passage and the auxiliary middle pressure passage of the second valve seat simultaneously.

16. A pulse tube refrigerator according to claim 10, wherein the second rotary valve is configured to perform switching for establishing and interrupting communication between the second output port and the middle pressure input port, switching for establishing and interrupting communication between the second output port and the high pressure input port, and switching for establishing and interrupting communication between the second output port and the low pressure input port.

17. A pulse tube refrigerator according to claim 16, wherein the rotary valve unit and the reservoir comprise one unit.

18. A pulse tube refrigerator according to claim 16, further comprising:
a high pressure line communicating between the outlet port and the high pressure input port;
a low pressure line communicating between the inlet port and the low pressure input port;
a regenerator line for communication between a regenerator port of the regenerator and the first output port;
a pulse tube line communicating between a pulse tube port of the pulse tube and the second output port; and
a self sealing joint having a built-in check valve on one end and adapted to automatically open when connected and automatically close when separated, wherein the self sealing joint is connected to a joint between the outlet port and the high pressure line, a joint between the high pressure line and the, high pressure input port, a joint between the inlet port and the low pressure line, a joint between the low pressure line and the low pressure input port, a joint between the first output port and the regenerator line, a joint between the regenerator line and the regenerator port, a joint between the second output port and the pulse tube line, and a joint between the pulse tube line and the pulse tube port, and wherein a flexible tube is used for the high pressure line, the low pressure line, the regenerator line and the pulse tube line.

19. A pulse tube refrigerator according to claim 16, wherein the rotary valve unit comprises the first valve seat, a first output passage in communication with the first output port, and a first center hole in communication with the low pressure input port; the first valve element further comprises a high pressure groove in communication with the high pressure input port and a low pressure groove in communication with the low pressure input port, the second valve seat further comprises a second output passage in communication with the second output port and a middle pressure passage in communication with the middle pressure input port, the second valve element further comprises an arc shaped groove for establishing communication between the second output passage and the middle pressure passage, an auxiliary high pressure groove in communication with the high pressure input port and an auxiliary low pressure groove in communication with the low pressure input port, and wherein the first valve element and the second valve element are adapted to be rotated by rotation of the shaft of the motor, wherein the communication between the high pressure input port and the first output port is established when the high pressure groove of the first valve element meets the first output passage of the first valve seat, the communication between the low pressure input port and the first output port is established when the low pressure groove of the first valve element meets the first output passage of the first valve seat, the communication between the middle pressure input port and the second output port is established when the arc shaped groove of the second valve element meets the second output passage and the middle pressure passage of the second valve seat simultaneously, the communication between the high pressure input port and the second output port is established when the auxiliary high pressure groove of the second valve element meets the second output passage of the second valve seat, and the communication between the low pressure input port and the second output port is established when the auxiliary low pressure groove of the second valve element meets the second output passage of the second valve seat.

20. A pulse tube refrigerator according to claim 10, wherein the rotary valve unit and the reservoir comprise one unit.

21. A pulse tube refrigerator according to claim 10, further comprising a high pressure line communicating between the outlet port and the high pressure input port, a low pressure line communicating between the inlet port and the low pressure input port, a regenerator line communicating between a regenerator port of the regenerator and the first output port a pulse tube line communicating between a pulse tube port of the pulse tube and the second output port, a self sealing joint having a built-in check valve on one end and adapted to automatically open when connected and to automatically close when separated, wherein the self sealing joint is connected to a joint between the outlet port and the high pressure line, a joint between the high pressure line and the high pressure input port, a joint between the inlet port and the low pressure line, a joint between the low pressure line and the low pressure input port, a joint between the first output port and the regenerator line, a joint between the regenerator line and the regenerator port, a joint between the second output port and the pulse tube line, and a joint between the pulse tube line and the pulse tube port, and wherein a flexible tube used for the high pressure line, the low pressure line, the regenerator line and the pulse tube line.

* * * * *